United States Patent
Kermani et al.

(10) Patent No.: US 12,540,351 B2
(45) Date of Patent: Feb. 3, 2026

(54) IDENTIFICATION OF SOMATIC MUTATIONS VERSUS GERMLINE VARIANTS FOR CELL-FREE DNA VARIANT CALLING APPLICATIONS

(71) Applicant: Guardant Health, Inc., Redwood City, CA (US)

(72) Inventors: Bahram Ghaffarzadeh Kermani, Los Altos, CA (US); Helmy Eltoukhy, Atherton, CA (US)

(73) Assignee: Guardant Health, Inc., Palo Alto, CA (US)

( * ) Notice: Subject to any disclaimer, the term of this patent is extended or adjusted under 35 U.S.C. 154(b) by 0 days.

(21) Appl. No.: 15/254,363

(22) Filed: Sep. 1, 2016

(65) Prior Publication Data

US 2017/0058332 A1 Mar. 2, 2017

Related U.S. Application Data

(60) Provisional application No. 62/213,456, filed on Sep. 2, 2015.

(51) Int. Cl.
  *C12Q 1/6886* (2018.01)
  *C12Q 1/6827* (2018.01)

(52) U.S. Cl.
  CPC ......... *C12Q 1/6827* (2013.01); *C12Q 1/6886* (2013.01); *C12Q 2600/156* (2013.01)

(58) Field of Classification Search
  CPC ............ C12Q 1/6886; C12Q 2600/106; C12Q 2600/156
  See application file for complete search history.

(56) References Cited

U.S. PATENT DOCUMENTS

| | | |
|---|---|---|
| 5,648,245 A | 7/1997 | Fire et al. |
| 5,952,170 A | 9/1999 | Stroun et al. |
| 6,492,121 B2 | 12/2002 | Kurane et al. |
| 6,582,908 B2 | 6/2003 | Fodor et al. |
| 7,163,789 B2 | 1/2007 | Chen et al. |
| 7,824,889 B2 | 11/2010 | Vogelstein et al. |
| 7,915,015 B2 | 3/2011 | Vogelstein et al. |
| 7,937,225 B2 | 5/2011 | Mishra et al. |

(Continued)

FOREIGN PATENT DOCUMENTS

| | | |
|---|---|---|
| EP | 1647600 A2 | 4/2006 |
| WO | WO-0058516 A2 | 10/2000 |

(Continued)

OTHER PUBLICATIONS

Chan, K.C.A. et al. Clinical Chemistry 59(1):211 (Jan. 2013).*

(Continued)

*Primary Examiner* — Diana B Johannsen
(74) *Attorney, Agent, or Firm* — Stephen W. Chen

(57) ABSTRACT

The present disclosure provides systems and methods to detect somatic or germline variants by providing a predetermined genomic DNA (gDNA) to an assay mixture, and capturing a sample of a subject's genetic information using a DNA sequencer and detecting genetic variants from the genetic information. A mutation may then be classified as being from a germline source if gDNA derived molecules have lengths inconsistent with those expected from cell-free DNA (cfDNA) derived molecules.

17 Claims, 2 Drawing Sheets

(56) References Cited

U.S. PATENT DOCUMENTS

| | | | |
|---|---|---|---|
| 8,603,749 | B2 | 12/2013 | Gillevet |
| 8,685,678 | B2 | 4/2014 | Casbon et al. |
| 9,404,156 | B2 | 8/2016 | Hicks et al. |
| 2001/0053519 | A1 | 12/2001 | Fodor et al. |
| 2002/0072058 | A1 | 6/2002 | Voelker et al. |
| 2003/0033091 | A1 | 2/2003 | Opalsky et al. |
| 2003/0152491 | A1 | 8/2003 | Kellogg et al. |
| 2006/0073506 | A1 | 4/2006 | Christians et al. |
| 2007/0065823 | A1 | 3/2007 | Dressman et al. |
| 2009/0105959 | A1 | 4/2009 | Braverman et al. |
| 2010/0069250 | A1 | 3/2010 | White, III et al. |
| 2010/0323348 | A1 | 12/2010 | Hamady et al. |
| 2011/0160078 | A1 | 6/2011 | Fodor et al. |
| 2011/0201507 | A1 | 8/2011 | Rava et al. |
| 2012/0316074 | A1 | 12/2012 | Saxonov |
| 2013/0005585 | A1 | 1/2013 | Anderson et al. |
| 2013/0022977 | A1 | 1/2013 | Lapidus et al. |
| 2013/0210643 | A1 | 8/2013 | Casbon et al. |
| 2013/0224743 | A1 | 8/2013 | Casbon et al. |
| 2013/0237458 | A1 | 9/2013 | Casbon et al. |
| 2013/0267424 | A1 | 10/2013 | Casbon et al. |
| 2014/0100121 | A1* | 4/2014 | Lo .................. C12Q 1/6886 506/2 |
| 2015/0154375 | A1 | 6/2015 | Rosenblatt et al. |

FOREIGN PATENT DOCUMENTS

| | | |
|---|---|---|
| WO | WO-2012014877 A1 | 2/2012 |
| WO | WO-2013019075 A2 | 2/2013 |
| WO | WO-2014149134 A2 | 9/2014 |

OTHER PUBLICATIONS

Rieneck, K. et al. Transfusion 53:2892-2898 (online Apr. 3, 2013). (Year: 2013).*

Dunham, J. P. et al. NIH Public Access Author Manuscript of Cold Spring Harbor Protoc. 2013(9):.doi.1101/pdb.prot074187. (25 pages) (Year: 2013).*

Benesova, L. et al. Analytical Biochemistry 433:227-234 (online Jun. 28, 2012). (Year: 2012).*

Alkan, et al. Personalized copy number and segmental duplication maps using next-generation sequencing. Nat Genet. Oct. 2009;41(10):1061-7. doi: 10.1038/ng.437. Epub Aug. 30, 2009.

Atanur, et al. The genome sequence of the spontaneously hypertensive rat: Analysis and functional significance. Genome Res. Jun. 2010;20(6):791-803. doi: 10.1101/gr.103499.109. Epub Apr. 29, 2010.

Bonaldo, et al. Normalization and subtraction: two approaches to facilitate gene discovery. Genome Res. Sep. 1996;6(9):791-806.

Carr, et al. Inferring relative proportions of DNA variants from sequencing electropherograms. Bioinformatics. Dec. 15, 2009;25(24):3244-50. doi: 10.1093/bioinformatics/btp583. Epub Oct. 9, 2009.

Castle, et al. DNA copy number, including telomeres and mitochondria, assayed using next-generation sequencing. BMC Genomics. Apr. 16, 2010;11:244. doi: 10.1186/1471-2164-11-244.

Chang, et al. Detection of allelic imbalance in ascitic supernatant by digital single nucleotide polymorphism analysis. Clin Cancer Res. Aug. 2002;8(8):2580-5.

Costello, et al. Discovery and characterization of artifactual mutations in deep coverage targeted capture sequencing data due to oxidative DNA damage during sample preparation. Nucleic Acids Res. Apr. 1, 2013;41(6):e67. doi: 10.1093/nar/gks1443. Epub Jan. 8, 2013.

Daines, et al. High-throughput multiplex sequencing to discover copy number variants in *Drosophila*. Genetics. Aug. 2009;182(4):935-41. doi: 10.1534/genetics.109.103218. Epub Jun. 15, 2009.

Fan, et al. Non-invasive prenatal measurement of the fetal genome. Nature. Jul. 19, 2012;487(7407):320-4. doi: 10.1038/nature11251.

Grant, et al. SNP genotyping on a genome-wide amplified DOP-PCR template. Nucleic Acids Res. Nov. 15, 2002;30(22):e125.

Green, et al. Molecular Cloning: A Laboratory Manual. Fourth Edition. vol. 1. Cold Spring Harbor Laboratory Press, Cold Spring Harbor, N.Y. 2012. 34 pages.

Gundry, et al. Direct, genome-wide assessment of DNA mutations in single cells. Nucleic Acids Res. Mar. 2012;40(5):2032-40. doi: 10.1093/nar/gkr949. Epub Nov. 15, 2011.

Gundry, et al. Direct mutation analysis by high-throughput sequencing: from germline to low-abundant, somatic variants. Mutat Res. Jan. 3, 2012;729(1-2):1-15. doi: 10.1016/mrfmmm.2011.10.001. Epub Oct. 12, 2011.

Hamady, et al. Error-correcting barcoded primers for pyrosequencing hundreds of samples in multiplex. Nat Methods. Mar. 2008;5(3):235-7. doi: 10.1038/nmeth.1184. Epub Feb. 10, 2008.

Hensel, et al. Simultaneous identification of bacterial virulence genes by negative selection. Science. Jul. 21, 1995;269(5222):400-3.

Hiatt, et al. Single molecule molecular inversion probes for targeted, high-accuracy detection of low-frequency variation. Genome Res. May 2013;23(5):843-54. doi: 10.1101/gr.147686.112. Epub Feb. 4, 2013.

International search report and written opinion dated May 7, 2012 for PCT/IB2011/003160.

Lizardi, et al. Mutation detection and single-molecule counting using isothermal rolling-circle amplification. Nat Genet. Jul. 1998;19(3):225-32.

Makrigiorgos, et al., A PCR-Based amplification method retaining quantative difference between two complex genomes. Nature Biotech, vol. 20, No. 9, pp. 936-939 (Sep. 2002).

Medvedev, et al. Detecting copy number variation with mated short reads. Genome Res. Nov. 2010;20(11):1613-22. doi: 10.1101/gr.106344.110. Epub Aug. 30, 2010.

Mei, et al. Identification of recurrent regions of Copy-Number Variants across multiple individuals. BMC Bioinformatics. Mar. 22, 2010;11:147. doi: 10.1186/1471-2105-11-147.

Notice of allowance dated Mar. 21, 2014 for U.S. Appl. No. 12/969,581.

Notice of allowance dated Jun. 19, 2014 for U.S. Appl. No. 12/969,581.

Notice of allowance dated Aug. 22, 2014 for U.S. Appl. No. 12/969,581.

Office action dated Oct. 3, 2013 for U.S. Appl. No. 12/969,581.

Ogino, et al. Quantification of PCR bias caused by a single nucleotide polymorphism in SMN gene dosage analysis. J Mol Diagn. Nov. 2002;4(4):185-90.

Park, et al. Discovery of common Asian copy number variants using integrated high-resolution array CGH and massively parallel DNA sequencing. Nat Genet. May 2010;42(5):400-5. doi: 10.1038/ng.555. Epub Apr. 4, 2010.

Pleasance, et al. A small-cell lung cancer genome with complex signatures of tobacco exposure. Nature. Jan. 14, 2010;463(7278):184-90. doi: 10.1038/nature08629. Epub Dec. 16, 2009.

Simpson, et al. Copy number variant detection in inbred strains from short read sequence data. Bioinformatics. Feb. 15, 2010;26(4):565-7. doi: 10.1093/bioinformatics/btp693. Epub Dec. 18, 2009.

Tan, et al. Genome-wide comparison of DNA hydroxymethylation in mouse embryonic stem cells and neural progenitor cells by a new comparative hMeDIP-seq method. Nucleic Acids Res. Apr. 2013;41(7):e84. doi: 10.1093/nar/gkt091. Epub Feb. 13, 2013.

Taudien, et al. Haplotyping and copy number estimation of the highly polymorphic human beta-defensin locus on 8p23 by 454 amplicon sequencing. BMC Genomics. Apr. 19, 2010;11:252. doi: 10.1186/1471-2164-11-252.

Tomaz, et al. Differential methylation as a cause of allele dropout at the imprinted GNAS locus. Genet Test Mol Biomarkers. Aug. 2010; 14(4):455-60. doi: 10.1089/gtmb.2010.0029.

U.S. Appl. No. 61/384,001, filed Sep. 17, 2010.

U.S. Appl. No. 61/432,119, filed Jan. 12, 2011.

Walker, et al. Isothermal in vitro amplification of DNA by a restriction enzyme/DNA polymerase system. Proc Natl Acad Sci U S A. Jan. 1, 1992;89(1):392-6.

(56) References Cited

OTHER PUBLICATIONS

Walsh, et al. Detection of inherited mutations for breast and ovarian cancer using genomic capture and massively parallel sequencing. Proc Natl Acad Sci U S A. Jul. 13, 2010;107(28):12629-33. doi: 10.1073/pnas.1007983107. Epub Jun. 28, 2010.

Weber, et al. A real-time polymerase chain reaction assay for quantification of allele ratios and correction of amplification bias. Anal Biochem. Sep. 15, 2003;320(2):252-8.

Wojdacs, et al. Primer design versus PCR bias in methylation independent PCR amplifications. Epigenetics. May 16, 2009;4(4):231-4. Epub May 14, 2009.

Wood, et al. Using next-generation sequencing for high resolution multiplex analysis of copy number variation from nanogram quantities of DNA from formalin-fixed paraffin-embedded specimens. Nucleic Acids Res. Aug. 2010;38(14):e151. doi: 10.1093/nar/gkq510. Epub Jun. 4, 2010.

Yandell, et al. A probabilistic disease-gene finder for personal genomes. Genome Res. Sep. 2011;21(9):1529-42. doi: 10.1101/gr.123158.111. Epub Jun. 23, 2011.

Yoon, et al. Sensitive and accurate detection of copy number variants using read depth of coverage. Genome Res. Sep. 2009;19(9):1586-92. doi: 10.1101/gr.092981.109. Epub Aug. 5, 2009.

Zhang, et al. The impact of next-generation sequencing on genomics. J Genet Genomics. Mar. 20, 2011;38(3):95-109. doi: 10.1016/j.jgg.2011.02.003. Epub Mar. 15, 2011.

Final Office Action for U.S. Appl. No. 17/322,314 dated Nov. 15, 2021.

Office action dated Jul. 20, 2021 for U.S. Appl. No. 17/322,314.

\* cited by examiner

IDENTIFICATION OF SOMATIC MUTATIONS VERSUS GERMLINE VARIANTS FOR CELL-FREE DNA VARIANT CALLING APPLICATIONS

CROSS-REFERENCE

This application claims priority to U.S. Provisional Application No. 62/213,456, filed Sep. 2, 2015, which is hereby incorporated by reference in its entirety.

BACKGROUND

Comparison of the genome of a subject and a reference genome (e.g., GRCh38.p4), will typically show differences (genetic variation) at about 0.01% of bases. Genetic variants in the germline can represent SNPs transferred through normal heredity or through germinal mutations. Variations can exist in homozygous or heterozygous form.

Certain pathological states, such as cancer, are characterized by genetic variations in the genomes of pathological cells as compared to the germline genome. These variations result from mutation in somatic cells, and are referred to as somatic mutations.

Polynucleotides harboring somatic mutations can be detected in cell-free DNA (cfDNA), where they are mixed with DNA from cells having the germline genome. Where a large background (germline) is present in cfDNA, no computer implemented process can differentiate germline variants from somatic mutations automatically. Instead, conventional systems rely on the expertise of an individual human expert or a consortium of experts (in either case called a Tumor Board) to distinguish somatic mutations from the germline ones.

If noise and biases were to be absent, the germline variants would be those with an allelic fraction of 50% (in the case of heterozygous (het) loci) or 100% (in the case of homozygous (homo) loci). However, in practice, the existence of noise and biases in the system make these crisp numbers fuzzy. In other words, the het or homo loci are not detected at exactly 50% or 100%, but are instead between lower and upper confidence bounds for each of the het and homo categories. For example, a het locus could be in the range of 40% to 60%, while a homo locus could be in the range of 98% to 100%.

SUMMARY

In an aspect, the present disclosure provides a method to detect a somatic or germline variant, comprising providing a predetermined genomic DNA (gDNA) to an assay mixture, capturing a sample of a subject's genetic information using a gene analyzer, and detecting genetic variants from the genetic information; and classifying a variant as from a germ line source if present in gDNA derived molecules having lengths longer than cell-free DNA (cfDNA) derived molecules. In some embodiments, the gDNA has a fragment length of more than about 200 bases. In some embodiments, the gDNA has a fragment length of at least 400 bases or at least 500 bases. In some embodiments, gDNA fragment length is higher than the cfDNA fragment length distribution. In some embodiments, the gDNA is added to the assay mixture. In some embodiments, the gDNA is left in the assay mixture after a filtering operation. In some embodiments, the gDNA is left in the assay mixture after a centrifugation operation. In some embodiments, approximately 1% to 5% gDNA is added to the assay mixture. In some embodiments, at least 1% gDNA is added to the assay mixture.

In some embodiments, the method comprises discovering a mutation. In some embodiments, the method comprises applying a sequencing technique to detect the genetic variant. In some embodiments, the sequencing technique is selected from the group consisting of: targeted sequencing, single molecule real-time sequencing, exon sequencing, electron microscopy-based sequencing, panel sequencing, transistor-mediated sequencing, direct sequencing, random shotgun sequencing, Sanger dideoxy termination sequencing, whole-genome sequencing, sequencing by hybridization, pyrosequencing, capillary electrophoresis, gel electrophoresis, duplex sequencing, cycle sequencing, single-base extension sequencing, solid-phase sequencing, high-throughput sequencing, massively parallel signature sequencing, emulsion PCR, co-amplification at lower denaturation temperature-PCR (COLD-PCR), multiplex PCR, sequencing by reversible dye terminator, paired-end sequencing, near-term sequencing, exonuclease sequencing, sequencing by ligation, short-read sequencing, single-molecule sequencing, sequencing-by-synthesis, real-time sequencing, reverse-terminator sequencing, nanopore sequencing, 454 sequencing, Solexa Genome Analyzer sequencing, SOLiD™ sequencing, MS-PET sequencing, and a combination thereof.

In some embodiments, the method comprises classifying a variant as a somatic mutation if gDNA derived molecules have lengths less than cell-free DNA (cfDNA) derived molecules. In some embodiments, the method comprises detecting the lengths of gDNA derived molecules and cfDNA derived molecules.

In another aspect, the present disclosure provides method comprising providing a sample comprising both genomic DNA (gDNA) and cell-free DNA (cfDNA) from a subject; determining subject germline genotype at at least one genetic locus from the gDNA; determining a quantitative measure of at least one genetic variant at each genetic locus in the cfDNA; determining whether the quantitative measure of the genetic variant is or is not consistent with germline genotype; and calling the genetic variant as a germline variant if the quantitative measure is consistent with germline genotype, or as a somatic mutant if the quantitative measure is not consistent with the germline genotype.

In some embodiments, determining the subject germline genotype at at least one genetic locus from the gDNA comprises sequencing the genetic locus from the gDNA. In some embodiments, determining the quantitative measure of at least one genetic variant at each genetic locus in the cfDNA comprises sequencing the genetic locus in the cfDNA. In some embodiments, the sequencing is selected from the group consisting of: targeted sequencing, single molecule real-time sequencing, exon sequencing, electron microscopy-based sequencing, panel sequencing, transistor-mediated sequencing, direct sequencing, random shotgun sequencing, Sanger dideoxy termination sequencing, whole-genome sequencing, sequencing by hybridization, pyrosequencing, capillary electrophoresis, gel electrophoresis, duplex sequencing, cycle sequencing, single-base extension sequencing, solid-phase sequencing, high-throughput sequencing, massively parallel signature sequencing, emulsion PCR, co-amplification at lower denaturation temperature-PCR (COLD-PCR), multiplex PCR, sequencing by reversible dye terminator, paired-end sequencing, near-term sequencing, exonuclease sequencing, sequencing by ligation, short-read sequencing, single-molecule sequencing, sequencing-by-synthesis, real-time sequencing, reverse-terminator sequencing, nanopore sequencing, 454 sequencing, Solexa Genome Analyzer sequencing, SOLiD™ sequencing, MS-PET sequencing, and a combination thereof.

In another aspect, the present disclosure provides a method comprising providing a sample comprising both genomic DNA (gDNA) and cell-free DNA (cfDNA) from a subject; sequencing both the gDNA and the cfDNA in the sample; determining the frequency of at least one genetic variant at at least one genetic locus in the cfDNA in the sample; based on the at least one allelic frequency of the at least one genetic locus in the cfDNA, determining the subject germline genotype at the at least one locus by determining at the at least one allelic frequency at a genetic locus in the gDNA; and calling the genetic variant as a germline variant or as a somatic mutation based on a comparison between the genotype determined and the variant frequency in the cfDNA. In some embodiments, the allelic frequency is the frequency of the genetic variant. In some embodiments, the comparison is based on relative frequency of the genetic variant in the gDNA and the cfDNA. In some embodiments, the sample comprises gDNA spiked into the sample. In some embodiments, the gDNA is left in the sample after a filtering operation. In some embodiments, the gDNA is left in the sample after a centrifugation operation. In some embodiments, the gDNA and the cfDNA are tagged with tags indexing gDNA and cfDNA. In some embodiments, the gDNA comprises any of less than 1%, less than 5%, at least 1%, or at least 5% of the total DNA in the sample.

In some embodiments, the sample is selected from blood, serum, plasma, urine, cerebrospinal fluid, saliva, stool, lymph fluid, synovial fluid, cystic fluid, ascites, pleural effusion, amniotic fluid, chorionic villus sample, fluid from a preimplantation embryo, a placental sample, lavage and cervical vaginal fluid, interstitial fluid, a buccal swab sample, sputum, bronchial lavage, a Pap smear sample, or ocular fluid. In some embodiments, the subject has or is being tested for cancer or an inflammatory disorder. In some embodiments, the genotype is determined if the allelic frequency in the cfDNA is between about 30% and about 70%. In some embodiments, the sequencing is selected from the group consisting of: targeted sequencing, single molecule real-time sequencing, exon sequencing, electron microscopy-based sequencing, panel sequencing, transistor-mediated sequencing, direct sequencing, random shotgun sequencing, Sanger dideoxy termination sequencing, whole-genome sequencing, sequencing by hybridization, pyrosequencing, capillary electrophoresis, gel electrophoresis, duplex sequencing, cycle sequencing, single-base extension sequencing, solid-phase sequencing, high-throughput sequencing, massively parallel signature sequencing, emulsion PCR, co-amplification at lower denaturation temperature-PCR (COLD-PCR), multiplex PCR, sequencing by reversible dye terminator, paired-end sequencing, near-term sequencing, exonuclease sequencing, sequencing by ligation, short-read sequencing, single-molecule sequencing, sequencing-by-synthesis, real-time sequencing, reverse-terminator sequencing, nanopore sequencing, 454 sequencing, Solexa Genome Analyzer sequencing, SOLiD™ sequencing, MS-PET sequencing, and a combination thereof. In some embodiments, sequencing comprises high-throughput sequencing. In some embodiments, sequencing comprises panel sequencing. In some embodiments, sequencing comprises sequencing: at least portions of a plurality of genes in the gDNA; at least portions of a plurality of genes in the cfDNA; or at least portions of a plurality of genes in the gDNA and at least portions of a plurality of genes in the cfDNA.

In some embodiments, the plurality of genes comprises at least 10, at least 25, or at least 50 different genes. In some embodiments, a plurality of the genes in the gDNA are oncogenes; a plurality of the genes in the cfDNA are oncogenes; or a plurality of the genes in the gDNA are oncogenes and a plurality of the genes in the cfDNA are oncogenes. In some embodiments, the method comprises enriching the gDNA, the cfDNA, or both, before sequencing. In some embodiments, the enrichment comprises performing sequence capture. In some embodiments, gDNA is identified by length of a DNA fragment or the length of sequence read. In some embodiments, frequency of the dominant allele in the gDNA is determined. In some embodiments, the genotype is determined using a probabilistic function. In some embodiments, a frequency of an allele of at least 95% in the gDNA indicates a probable homozygous genotype for that allele. In some embodiments, a frequency of an allele of between 30% and 70% in gDNA indicates a probable heterozygous genotype for that allele. In some embodiments, calling the genetic variant as a germline variant or as a somatic mutation based on a comparison between the genotype determined and the variant frequency in the cfDNA comprises determining frequency of an allele in the cell-free portion of the DNA. In some embodiments, the step of, based on the at least one allelic frequency of the at least one genetic locus in the cfDNA, determining the subject germline genotype at the at least one locus by determining at the at least one allelic frequency at a genetic locus in the gDNA, comprises determining frequency of an allele in the cell free portion of the DNA. In some embodiments, calling the genetic variant comprises determining whether the frequency is or is not consistent with the probable genotype determined as described, wherein a variant having a frequency inconsistent with the probably genotype is called as a somatic mutant. In some embodiments, relative frequencies that diverge by a function indicate that the allele is a somatic mutation. In some embodiments, the method comprises comprising performing the step of, based on the at least one allelic frequency of the at least one genetic locus in the cfDNA, determining the subject germline genotype at the at least one locus by determining at the at least one allelic frequency at a genetic locus in the gDNA, when the frequency in cfDNA is consistent with a heterozygous or a homozygous germline genotype. In some embodiments, the genetic variant is called as a somatic mutation if the subject is a probable homozygote for an allele that is different than the genetic variant.

In another aspect, the present disclosure provides a method comprising determining a quantitative measure of a genetic variant detected in cell-free DNA (cfDNA) from a subject; determining that the measure is consistent with a heterozygous genotype in the subject; determining a probable genotype of the subject at the locus from genomic DNA (gDNA); comparing the genotype at the locus from gDNA with the variant detected in the cfDNA; and calling the variant as a somatic mutation if the variant detected in the cfDNA is not consistent with the genotype at the locus from gDNA. In some embodiments, calling the variant as a somatic mutation if the genotype at the locus from gDNA is determined to be homozygous. In some embodiments, calling the variant as a somatic mutation if the genotype at the locus from gDNA is determined to be heterozygous with a confidence selected from the group consisting of: at least 70%, at least 80%, at least 90%, at least 95%, or at least 99%. In some embodiments, determining a quantitative measure of a genetic variant comprises sequencing the cfDNA. In some embodiments, determining the probable genotype of the subject comprises sequencing genomic DNA from the subject. In some embodiments, the sequencing is selected from the group consisting of: targeted sequencing, single molecule real-time sequencing, exon sequencing, electron microscopy-based sequencing, panel sequencing, transistor-mediated sequencing, direct sequencing, random shotgun sequencing, Sanger dideoxy termination sequencing, whole-genome sequencing, sequencing by hybridization, pyrosequencing, capillary electrophoresis, gel electrophoresis, duplex sequencing, cycle sequencing, single-base extension sequencing, solid-phase sequencing, high-throughput sequencing, massively parallel signature sequencing, emulsion PCR, co-amplification at lower denaturation temperature-PCR (COLD-PCR), multiplex PCR, sequencing by reversible dye terminator, paired-end sequencing, near-term sequencing, exonuclease sequencing, sequencing by ligation, short-read sequencing, single-molecule sequencing, sequencing-by-synthesis, real-time sequencing, reverse-terminator sequencing, nanopore sequencing, 454 sequencing, Solexa Genome Analyzer sequencing, SOLiD™ sequencing, MS-PET sequencing, and a combination thereof.

In some embodiments, a variant not consistent with the genotype is not consistent with heterozygosity. In some embodiments, determining that the measure is consistent with the heterozygous genotype comprises determining that the measure falls above a cut-off level consistent with heterozygosity. In some embodiments, the gDNA and the cfDNA are present in a sample, and wherein the gDNA and cfDNA in the sample are sequenced. In some embodiments, the sequencing is selected from the group consisting of: targeted sequencing, single molecule real-time sequencing, exon sequencing, electron microscopy-based sequencing, panel sequencing, transistor-mediated sequencing, direct sequencing, random shotgun sequencing, Sanger dideoxy termination sequencing, whole-genome sequencing, sequencing by hybridization, pyrosequencing, capillary electrophoresis, gel electrophoresis, duplex sequencing, cycle sequencing, single-base extension sequencing, solid-phase sequencing, high-throughput sequencing, massively parallel signature sequencing, emulsion PCR, co-amplification at lower denaturation temperature-PCR (COLD-PCR), multiplex PCR, sequencing by reversible dye terminator, paired-end sequencing, near-term sequencing, exonuclease sequencing, sequencing by ligation, short-read sequencing, single-molecule sequencing, sequencing-by-synthesis, real-time sequencing, reverse-terminator sequencing, nanopore sequencing, 454 sequencing, Solexa Genome Analyzer sequencing, SOLiD™ sequencing, MS-PET sequencing, and a combination thereof. In some embodiments, the quantitative measure is the percent of sequence reads mapped to the locus that comprises the variant.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION

Figure 1:
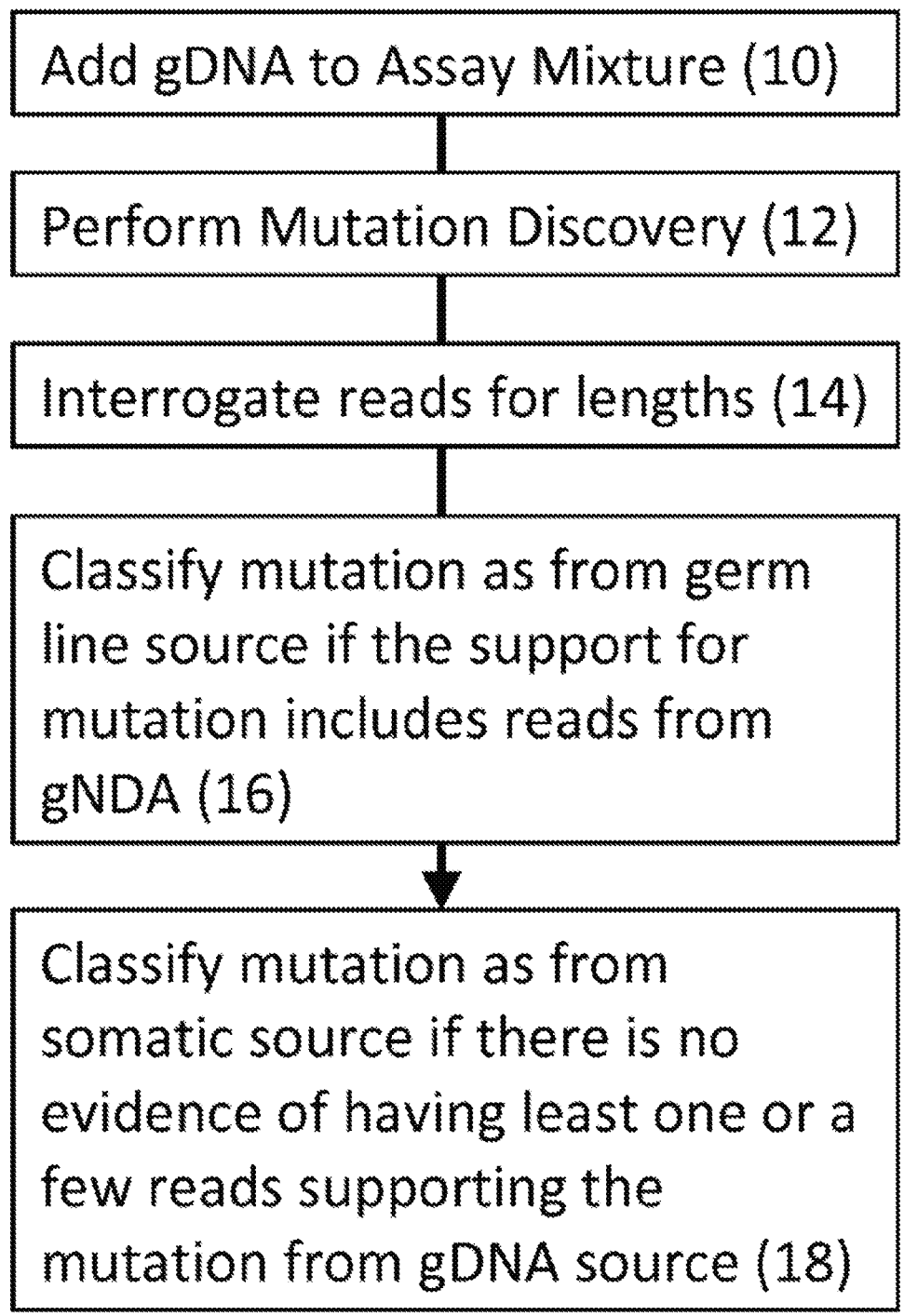
FIG. 1 depicts an exemplary system for the identification of somatic versus germline variants for cell-free DNA variant calling applications.

The section headings used herein are for organizational purposes only and are not to be construed as limiting the described subject matter in any way.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless described otherwise, all technical and scientific terms used herein have a meaning as is commonly understood by one of ordinary skill in the art to which the various embodiments described herein belongs.

It will be appreciated that there is an implied "about" prior to the temperatures, concentrations, times, number of bases, coverage, etc. discussed in the present teachings, such that slight and insubstantial equivalents are within the scope of the present teachings. In this application, the use of the singular includes the plural unless specifically stated otherwise. Also, the use of "comprise", "comprises", "comprising", "contain", "contains", "containing", "include", "includes", and "including" are not intended to be limiting. It is to be understood that both the foregoing general description and the following detailed description are exemplary and explanatory only and are not restrictive of the present teachings.

As used herein, "a" or "an" also may refer to "at least one" or to "one or more." Also, the use of "or" is inclusive, such that the phrase "A or B" is true when "A" is true, "B" is true, or both "A" and "B" are true.

Further, unless otherwise required by context, singular terms shall include pluralities and plural terms shall include the singular. Generally, nomenclatures utilized in connection with, and techniques of, cell and tissue culture, molecular biology, and protein and oligo- or polynucleotide chemistry and hybridization described herein are those well-known and commonly used in the art. Standard techniques are used, for example, for nucleic acid purification and preparation, chemical analysis, recombinant nucleic acid, and oligonucleotide synthesis. Enzymatic reactions and purification techniques are performed according to manufacturer's specifications or as commonly accomplished in the art or as described herein. The techniques and procedures described herein are generally performed according to conventional methods well known in the art and as described in various general and more specific references that are cited and discussed throughout the instant specification. See, e.g., Sambrook et al., Molecular Cloning: A Laboratory Manual (Third ed., Cold Spring Harbor Laboratory Press, Cold Spring Harbor, N.Y. 2000). The nomenclatures utilized in connection with, and the laboratory procedures and techniques described herein are those well-known and commonly used in the art.

A "system" sets forth a set of components, real or abstract, comprising a whole where each component interacts with or is related to at least one other component within the whole.

A "biomolecule" may refer to any molecule that is produced by a biological organism, including large polymeric molecules such as proteins, polysaccharides, lipids, and nucleic acids (DNA and RNA), as well as small molecules such as primary metabolites, secondary metabolites, and other natural products.

As used herein, the term "sequencing" refers to any of a number of technologies used to determine the sequence of a biomolecule, e.g., a nucleic acid such as DNA or RNA. Exemplary sequencing methods include, but are not limited to, targeted sequencing, single molecule real-time sequencing, exon sequencing, electron microscopy-based sequencing, panel sequencing, transistor-mediated sequencing, direct sequencing, random shotgun sequencing, Sanger dideoxy termination sequencing, whole-genome sequencing, sequencing by hybridization, pyrosequencing, capillary electrophoresis, gel electrophoresis, duplex sequencing, cycle sequencing, single-base extension sequencing, solid-phase sequencing, high-throughput sequencing, massively parallel signature sequencing, emulsion PCR, co-amplification at lower denaturation temperature-PCR (COLD-PCR), multiplex PCR, sequencing by reversible dye terminator, paired-end sequencing, near-term sequencing, exonuclease sequencing, sequencing by ligation, short-read sequencing, single-molecule sequencing, sequencing-by-synthesis, real-time sequencing, reverse-terminator sequencing, nanopore sequencing, 454 sequencing, Solexa Genome Analyzer sequencing, SOLiD™ sequencing, MS-PET sequencing, and a combination thereof. In some embodiments, sequencing can be performer by a gene analyzer such as, for example, gene analyzers commercially available from Illumina or Applied Biosystems.

The phrase "next generation sequencing" or NGS refers to sequencing technologies having increased throughput as compared to traditional Sanger- and capillary electrophoresis-based approaches, for example, with the ability to generate hundreds of thousands of relatively small sequence reads at a time. Some examples of next generation sequencing techniques include, but are not limited to, sequencing by synthesis, sequencing by ligation, and sequencing by hybridization.

The phrase "sequencing run" refers to any step or portion of a sequencing experiment performed to determine some information relating to at least one biomolecule (e.g., a nucleic acid molecule such as DNA or RNA).

The phase "base space" refers to a representation of the sequence of nucleotides. The phase "flow space" refers to a representation of the incorporation event or non-incorporation event for a particular nucleotide flow. For example, flow space can be a series of zeros and ones representing a nucleotide incorporation event (a one, "1") or a non-incorporation event (a zero, "0") for that particular nucleotide flow. It should be understood that zeros and ones are convenient representations of a non-incorporation event and a nucleotide incorporation event; however, any other symbol or designation could be used alternatively to represent and/or identify these events and non-events.

DNA (deoxyribonucleic acid) is a chain of nucleotides comprising four types of nucleotides; adenine (A), thymine (T), cytosine (C), and guanine (G). RNA (ribonucleic acid) is a chain of nucleotides comprising four types of nucleotides; A, uracil (U), G, and C. Certain pairs of nucleotides specifically bind to one another in a complementary fashion (called complementary base pairing). In DNA, adenine (A) pairs with thymine (T) and cytosine (C) pairs with guanine (G). In RNA, adenine (A) pairs with uracil (U) and cytosine (C) pairs with guanine (G). When a first nucleic acid strand binds to a second nucleic acid strand made up of nucleotides that are complementary to those in the first strand, the two strands bind to form a double strand. As used herein, "nucleic acid sequencing data," "nucleic acid sequencing information," "nucleic acid sequence," "nucleotide sequence", "genomic sequence," "genetic sequence," or "fragment sequence," or "nucleic acid sequencing read" denotes any information or data that is indicative of the order of the nucleotide bases (e.g., adenine, guanine, cytosine, and thymine or uracil) in a molecule (e.g., a whole genome, whole transcriptome, exome, oligonucleotide, polynucleotide, or fragment) of a nucleic acid such as DNA or RNA. It should be understood that the present teachings contemplate sequence information obtained using all available varieties of techniques, platforms or technologies, including, but not limited to: capillary electrophoresis, microarrays, ligation-based systems, polymerase-based systems, hybridization-based systems, direct or indirect nucleotide identification systems, pyrosequencing, ion- or pH-based detection systems, and electronic signature-based systems.

A "polynucleotide", "nucleic acid", or "oligonucleotide" refers to a linear polymer of nucleosides (including deoxyribonucleosides, ribonucleosides, or analogs thereof) joined by internucleosidic linkages. Typically, a polynucleotide comprises at least three nucleosides. Oligonucleotides often range in size from a few monomeric units, e.g. 3-4, to hundreds of monomeric units. Whenever a polynucleotide is represented by a sequence of letters, such as "ATGCCTG," it will be understood that the nucleotides are in 5'→3' order from left to right and that "A" denotes deoxyadenosine, "C" denotes deoxycytidine, "G" denotes deoxyguanosine, and "T" denotes thymidine, unless otherwise noted. The letters A, C, G, and T may be used to refer to the bases themselves, to nucleosides, or to nucleotides comprising the bases, as is standard in the art.

The terms "adaptor(s)", "adapter(s)" and "tag(s)" are used synonymously throughout this specification. An adaptor or tag can be coupled to a polynucleotide sequence to be "tagged" by any approach including ligation, hybridization, or other approaches.

As used herein, a common variant has at least 5% of GMAF (global minor allele frequency), while a low-frequency variant has about 0.1-5% of GMAF, and a rare variant has 0.5% or less GMAF, where GMAF is a frequency at which the least common allele occurs in a given population.

As used herein, "genotype" refers to allelic identity at a genetic locus on one or more germline chromosomes. This includes full genotype (allelic identity on all chromosomes), partial genotype (allelic identity on at least one chromosome) and null genotype (allele(s) not existing on one or more or all chromosomes), including determining homozygosity or heterozygosity at a locus ("allelic designation").

As used herein, a somatic variant indicates the source is a cancerous tissue. This is in contrast to germline variants, which have normal cells as a source. The variation can be passed on to daughter cells through mitotic division. This can result in a group of cells having a genetic difference from the rest of the cells of an organism. Additionally, as the variation does not occur in a germline cell, the mutation will not be inherited by progeny organisms.

SNP can refer to single-nucleotide polymorphism or variation in the population, usually in the context of germline variants, while SNV can refer to single-nucleotide variant and SSNV can refer to somatic single-nucleotide variant (usually used in the context of cancer-associated variants). For an individual, the term SNV is used for variations detected in both somatic (cancerous) and germline (normal) cfDNA.

CNV can refer copy-number variant (gene-level copy-number mutation, usually resulting from duplication event).

Cell-free DNA (cfDNA) from a subject having cancer comprises DNA both from cells bearing the germline genome (e.g., from "healthy cells") ("germline DNA") and DNA from cancer cells, typically bearing somatic mutations ("cancer DNA"). The relative amounts of germline DNA and cancer DNA in a cell-free DNA sample depends upon how advanced the cancer is. In early stages, only a small amount of the DNA is cancer DNA. This could be, for example, about 1%-5% of the total DNA. Thus, detecting a small amount (e.g., about 1%-5% of the cfDNA in a sample) of a genetic variant such as a minor allele may be indicative of a somatic mutation, and thus, the presence of cancer DNA. However, as the disease progresses and the tumor expands, the amount of cancer DNA in a cell-free DNA sample can increase significantly, for example to more than 25% of the total cell-free DNA. When the percentage of DNA molecules bearing a genetic variant reaches high levels, it may become ambiguous whether the variant represents a somatic mutation originating from cancer cells or represents heterozygosity in the germline DNA.

Figure 2A:
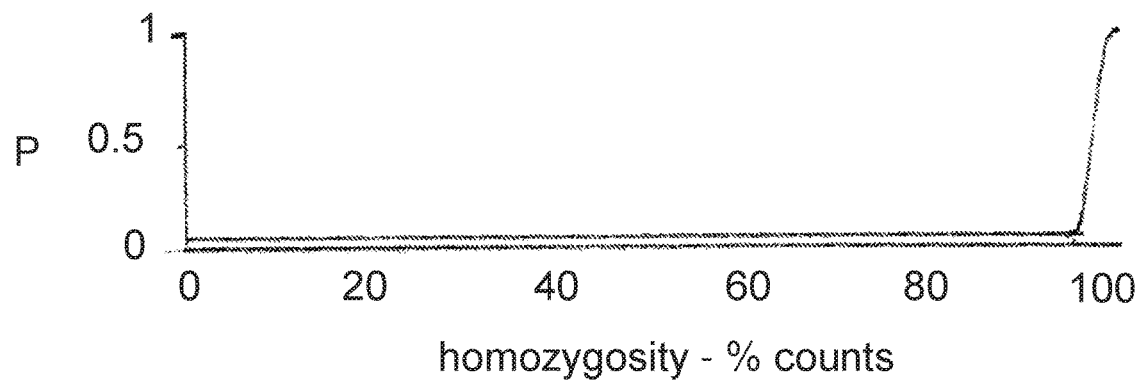
FIG. 2A depicts an exemplary probability distribution of variant frequency in germline DNA at homozygous loci.
Figure 2B:
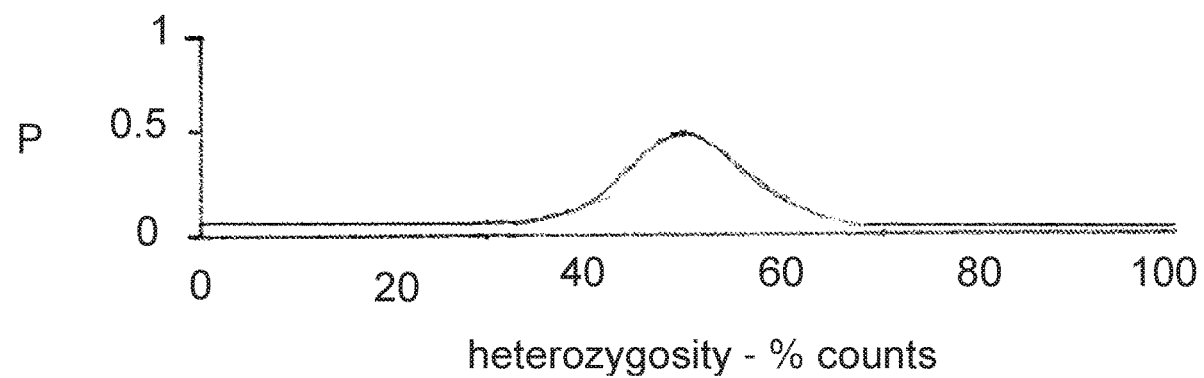
FIG. 2B depicts an exemplary probability distribution of variant frequency in germline DNA at heterozygous loci.

The germline DNA of a subject can be homozygous or heterozygous at any genetic locus. For a variety of reasons (including, for example, errors in DNA sequencing), in a set of sequence reads generated from cfDNA of a non-cancer subject, read counts for an allelic form (e.g., an SNV) mapping to a genetic locus for which the subject is homozygous may not be 100%. Similarly, read counts for an allelic form mapping to a genetic locus for which the subject is heterozygous may not be 50%. FIG. 2A and FIG. 2B show hypothetical probability distributions for the % counts of an allele generated by sequencing in homozygous and heterozygous scenarios, respectively. As can be seen, if an individual is homozygous in the germline for a genetic variant (not matching the allele in a reference genome, the percentage of base calls bearing the genetic variant will typically be close to, but not always identical to, 100% of the calls. Similarly, if an individual is heterozygous in the germline for a genetic variant, the percentage of base calls bearing the genetic variant will typically be close to 50%, but could range from 30% to 70%. Measurements in this range are consistent with heterozygosity at the locus. However, the measurement may make the determination ambiguous. In this case, one may call a genotype at a locus as heterozygous or homogzygous with a certain level of confidence or probability.

Accordingly, if a subject has cancer, and a genetic variant a locus is measured to be in a range consistent with heterozygosity, one's confidence that the variant resulted from a somatic mutation may be decreased as compared to a measurement in a range between homozygosity and heterozygosity. For example, a measurement in the range of 5% to 20% may indicate that a locus contains a genetic variant in an amount too high to be accounted for by homozygosity and too low to be accounted for by heterozygosity. Thus, it is likely that the measurement is a result of a somatic mutation. By contrast, a measurement around 40% may indicate heterozygosity or it may indicate an abundance of DNA containing a somatic mutation (for example, if that somatic mutation has caused a tumor that has contributed a large relative amount of DNA to the sample).

This disclosure provides, inter alia, methods of determining whether a genetic variant detected in a cell-free DNA sample is more likely to represent heterozygosity in the germline, or the presence of a somatic mutation, e.g., from cancer. Certain methods of this disclosure include determining the likely germline genotype of a subject based on the subject's genomic DNA (as used herein, DNA from the germline, or germline DNA), and then determining whether a genetic variant, detected in amounts consistent with heterozygosity in the germline, is actually a somatic mutation, based on comparison with the germline genotype. Germline genotype can be determined in a number of ways. In some embodiments, germline genotype is determined by sequencing DNA from normal cells (e.g., cells not containing the genetic variant being tested for, such as healthy non-tumor cells) from the subject. In some embodiments, germline genotype is determined based on the sequence of genomic DNA already present in a cell-free DNA sample. Germline DNA in a serum sample can be recognized by its size. Cell-free DNA is characterized by having a size distribution between about 110 and about 230 nucleotides, with a mode of about 168 nucleotides. However, a second, minor peak is also found between about 240 and 440 nucleotides. Some of this cfDNA can exist at a minor peak about twice this size. By contrast, genomic DNA typically has a size greater than about 500 nucleotides. Accordingly, sequence reads indicating that a nucleic acid molecule is greater than about 500 nucleotides are presumed to represent germline DNA rather than cell-free DNA. In some embodiments, a sample of cell-free DNA can be spiked with normal DNA bearing a tag that is distinguishable from a tag on the cfDNA. In some embodiments, cfDNA and gDNA in a sample can be differentially tagged to allow the cfDNA and gDNA to be distinguishable.

Tags can be any types of molecules attached to a polynucleotide, including, but not limited to, nucleic acids, chemical compounds, florescent probes, or radioactive probes. Tags can also be oligonucleotides (e.g., DNA or RNA). Tags can comprise known sequences, unknown sequences, or both. A tag can comprise random sequences, pre-determined sequences, or both. A tag can be double-stranded or single-stranded. A double-stranded tag can be a duplex tag. A double-stranded tag can comprise two complementary strands. Alternatively, a double-stranded tag can comprise a hybridized portion and a non-hybridized portion. The double-stranded tag can be Y-shaped, e.g., the hybridized portion is at one end of the tag and the non-hybridized portion is at the opposite end of the tag. One such example are the "Y adapters" used in Illumina sequencing. Other examples include hairpin shaped adapters or bubble shaped adapters. Bubble shaped adapters have non-complementary sequences flanked on both sides by complementary sequences.

Tagging disclosed herein can be performed using any method. A polynucleotide can be tagged with an adaptor by hybridization. For example, the adaptor can have a nucleotide sequence that is complementary to at least a portion of a sequence of the polynucleotide. As an alternative, a polynucleotide can be tagged with an adaptor by ligation.

For example, tagging can comprise using one or more enzymes. The enzyme can be a ligase. The ligase can be a DNA ligase. For example, the DNA ligase can be a T4 DNA ligase, *E. coli* DNA ligase, and/or mammalian ligase. The mammalian ligase can be DNA ligase I, DNA ligase III, or DNA ligase IV. The ligase can also be a thermostable ligase. Tags can be ligated to a blunt-end of a polynucleotide (blunt-end ligation). Alternatively, tags can be ligated to a sticky end of a polynucleotide (sticky-end ligation). Efficiency of ligation can be increased by optimizing various conditions. Efficiency of ligation can be increased by optimizing the reaction time of ligation. For example, the reaction time of ligation can be less than 12 hours, e.g., less than 1, less than 2, less than 3, less than 4, less than 5, less than 6, less than 7, less than 8, less than 9, less than 10, less than 11, less than 12, less than 13, less than 14, less than 15, less than 16, less than 17, less than 18, less than 19, or less than 20 hours. In a particular example, reaction time of ligation is less than 20 hours. Efficiency of ligation can be increased by optimizing the ligase concentration in the reaction. For example, the ligase concentration can be at least 10, at least 50, at least 100, at least 150, at least 200, at least 250, at least 300, at least 400, at least 500, or at least 600 unit/microliter. Efficiency can also be optimized by adding or varying the concentration of an enzyme suitable for ligation, enzyme cofactors or other additives, and/or optimizing a temperature of a solution having the enzyme. Efficiency can also be optimized by varying the addition order of various components of the reaction. The end of tag sequence can comprise dinucleotide to increase ligation efficiency. When the tag comprises a non-complementary portion (e.g., Y-shaped adaptor), the sequence on the complementary portion of the tag adaptor can comprise one or more selected sequences that promote ligation efficiency. Preferably such sequences are located at the terminal end of the tag. Such sequences can comprise 1, 2, 3, 4, 5, or 6 terminal bases. Reaction solution with high viscosity (e.g., a low Reynolds number) can also be used to increase ligation efficiency. For example, solution can have a Reynolds number less than 3000, less than 2000, less than 1000, less than 900, less than 800, less than 700, less than 600, less than 500, less than 400, less than 300, less than 200, less than 100, less than 50, less than 25, or less than 10. It is also contemplated that roughly unified distribution of fragments (e.g., tight standard deviation) can be used to increase ligation efficiency. For example, the variation in fragment sizes can vary by less than 20%, less than 15%, less than 10%, less than 5%, or less than 1%. Tagging can also comprise primer extension, for example, by polymerase chain reaction (PCR). Tagging can also comprise any of ligation-based PCR, multiplex PCR, single strand ligation, or single strand circularization.

In some instances, the tags herein comprise molecular barcodes. Such molecular barcodes can be used to differentiate polynucleotides in a sample. Preferably molecular barcodes are different from one another. For example, molecular barcodes can have a difference between them that can be characterized by a predetermined edit distance or a Hamming distance. In some instances, the molecular barcodes herein have a minimum edit distance of 1, 2, 3, 4, 5, 6, 7, 8, 9, or 10. To further improve efficiency of conversion (e.g., tagging) of untagged molecular to tagged molecules, one preferably utilizes short tags. For example, in some embodiments, a library adapter tag can be up to 65, 60, 55, 50, 45, 40, or 35 nucleotide bases in length. A collection of such short library barcodes preferably includes a number of different molecular barcodes, e.g., at least 2, 4, 6, 8, 10, 12, 14, 16, 18 or 20 different barcodes with a minimum edit distance of 1, 2, 3 or more.

Thus, a collection of molecules can include one or more tags. In some instances, some molecules in a collection can include an identifying tag ("identifier") such as a molecular barcode that is not shared by any other molecule in the collection. For example, in some instances of a collection of molecules, at least 50%, at least 51%, at least 52%, at least 53%, at least 54%, at least 55%, at least 56%, at least 57%, at least 58%, at least 59%, at least 60%, at least 61%, at least 62%, at least 63%, at least 64%, at least 65%, at least 66%, at least 67%, at least 68%, at least 69%, at least 70%, at least 71%, at least 72%, at least 73%, at least 74%, at least 75%, at least 76%, at least 77%, at least 78%, at least 79%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100% of the molecules in the collection can include an identifier or molecular barcode that is not shared by any other molecule in the collection. As used herein, a collection of molecules is considered to be "uniquely tagged" if each of at least 95% of the molecules in the collection bears an identifier that is not shared by any other molecule in the collection ("unique tag" or "unique identifier"). A collection of molecules is considered to be "non-uniquely tagged" if each of at least 1%, at least 5%, at least 10%, at least 15%, at least 20%, at least 25%, at least 30%, at least 35%, at least 40%, at least 45%, or at least or about 50% of the molecules in the collection bears an identifying tag or molecular barcode that is shared by at least one other molecule in the collection ("non-unique tag" or "non-unique identifier"). Accordingly, in a non-uniquely tagged population no more than 1% of the molecules are uniquely tagged. For example, in a non-uniquely tagged population, no more than 1%, 5%, 10%, 15%, 20%, 25%, 30%, 35%, 40%, 45%, or 50% of the molecules can be uniquely tagged.

A number of different tags can be used based on the estimated number of molecules in a sample. In some tagging methods, the number of different tags can be at least the same as the estimated number of molecules in the sample. In other tagging methods, the number of different tags can be at least two, three, four, five, six, seven, eight, nine, ten, one hundred or one thousand times as many as the estimated number of molecules in the sample. In unique tagging, at least two times (or more) as many different tags can be used as the estimated number of molecules in the sample.

The molecules in the sample may be non-uniquely tagged. In such instances a fewer number of tags or molecular barcodes is used then the number of molecules in the sample to be tagged. For example, no more than 100, 50, 40, 30, 20 or 10 unique tags or molecular barcodes are used to tag a complex sample such as a cell free DNA sample with many more different fragments.

The polynucleotide to be tagged can be fragmented, such as either naturally or using other approaches, such as, for example, shearing. The polynucleotides can be fragmented by certain methods, including but not limited to, mechanical shearing, passing the sample through a syringe, sonication, heat treatment (e.g., for 30 minutes at 90° C.), and/or nuclease treatment (e.g., using DNase, RNase, endonuclease, exonuclease, and/or restriction enzyme).

The polynucleotides fragments (prior to tagging) can comprise sequences of any length. For example, polynucleotide fragments (prior to tagging) can comprise at least 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, 300, 400, 500, 600, 700, 800, 900, 1000, 1100, 1200, 1300, 1400, 1500, 1600, 1700, 1800, 1900, 2000 or more nucleotides in length. The polynucleotide fragment are preferably about the average length of cell-free DNA. For example, the polynucleotide fragments can comprise about 160 bases in length. The polynucleotide fragment can also be fragmented from a larger fragment into smaller fragments about 160 bases in length.

Polynucleotides tagged can comprise sequences associated with cancer. The cancer-associated sequences can comprise single nucleotide variation (SNV), copy number variation (CNV), insertions, deletions, and/or rearrangements.

The polynucleotides can comprise sequences associated with cancer, such as acute lymphoblastic leukemia (ALL), acute myeloid leukemia (AML), adrenocortical carcinoma, Kaposi Sarcoma, anal cancer, basal cell carcinoma, bile duct cancer, bladder cancer, bone cancer, osteosarcoma, malignant fibrous histiocytoma, brain stem glioma, brain cancer, craniopharyngioma, ependymoblastoma, ependymoma, medulloblastoma, medulloepithelioma, pineal parenchymal tumor, breast cancer, bronchial tumor, Burkitt lymphoma, Non-Hodgkin lymphoma, carcinoid tumor, cervical cancer, chordoma, chronic lymphocytic leukemia (CLL), chronic myelogenous leukemia (CML), colon cancer, colorectal cancer, cutaneous T-cell lymphoma, ductal carcinoma in situ, endometrial cancer, esophageal cancer, Ewing Sarcoma, eye cancer, intraocular melanoma, retinoblastoma, fibrous histiocytoma, gallbladder cancer, gastric cancer, glioma, hairy cell leukemia, head and neck cancer, heart cancer, hepatocellular (liver) cancer, Hodgkin lymphoma, hypopharyngeal cancer, kidney cancer, laryngeal cancer, lip cancer, oral cavity cancer, lung cancer, non-small cell carcinoma, small cell carcinoma, melanoma, mouth cancer, myelodysplastic syndromes, multiple myeloma, medulloblastoma, nasal cavity cancer, paranasal sinus cancer, neuroblastoma, nasopharyngeal cancer, oral cancer, oropharyngeal cancer, osteosarcoma, ovarian cancer, pancreatic cancer, papillomatosis, paraganglioma, parathyroid cancer, penile cancer, pharyngeal cancer, pituitary tumor, plasma cell neoplasm, prostate cancer, rectal cancer, renal cell cancer, rhabdomyo sarcoma, salivary gland cancer, Sezary syndrome, skin cancer, nonmelanoma, small intestine cancer, soft tissue sarcoma, squamous cell carcinoma, testicular cancer, throat cancer, thymoma, thyroid cancer, urethral cancer, uterine cancer, uterine sarcoma, vaginal cancer, vulvar cancer, Waldenstrom macroglobulinemia, and/or Wilms Tumor.

A haploid human genome equivalent has about 3 picograms of DNA. A sample of about 1 microgram of DNA contains about 300,000 haploid human genome equivalents. Improvements in sequencing can be achieved as long as at least some of the duplicate or cognate polynucleotides bear unique identifiers with respect to each other, that is, bear different tags. However, in certain embodiments, the number of tags used is selected so that there is at least a 95% chance that all duplicate molecules starting at any one position bear unique identifiers. For example, in a sample comprising about 10,000 haploid human genome equivalents of fragmented genomic DNA, e.g., cfDNA, z is expected to be between 2 and 8. Such a population can be tagged with between about 10 and 100 different identifiers, for example, about 2 identifiers, about 4 identifiers, about 9 identifiers, about 16 identifiers, about 25 identifiers, about 36 different identifiers, about 49 different identifiers, about 64 different identifiers, about 81 different identifiers, or about 100 different identifiers.

Nucleic acid barcodes having identifiable sequences including molecular barcodes, can be used for tagging. For example, a plurality of DNA barcodes can comprise various numbers of sequences of nucleotides. A plurality of DNA barcodes having 2, 3, 4, 5, 6, 7, 8, 9, 10, 11, 12, 13, 14, 15, 16, 17, 18, 19, 20, 21, 22, 23, 24, 25, 26, 27, 28, 29, 30 or more identifiable sequences of nucleotides can be used. When attached to only one end of a polynucleotide, the plurality of DNA barcodes can produce 2, 3, 4, 5, 6, 7, 8, 9, 10, 11, 12, 13, 14, 15, 16, 17, 18, 19, 20, 21, 22, 23, 24, 25, 26, 27, 28, 29, 30 or more different identifiers. Alternatively, when attached to both ends of a polynucleotide, the plurality DNA barcodes can produce 4, 9, 16, 25, 36, 49, 64, 81, 100, 121, 144, 169, 196, 225, 256, 289, 324, 361, 400 or more different identifiers (which is the ^2 of when the DNA barcode is attached to only 1 end of a polynucleotide). In one example, a plurality of DNA barcodes having 6, 7, 8, 9 or 10 identifiable sequences of nucleotides can be used. When attached to both ends of a polynucleotide, they produce 36, 49, 64, 81 or 100 possible different identifiers, respectively. In a particular example, the plurality of DNA barcodes can comprise 8 identifiable sequences of nucleotides. When attached to only one end of a polynucleotide, the plurality of DNA barcodes can produce 8 different identifiers. Alternatively, when attached to both ends of a polynucleotide, the plurality of DNA barcodes can produce 64 different identifiers. Samples tagged in such a way can be those with a range of about 10 ng to any of about 100 ng, about 1 about 10 μg of fragmented polynucleotides, e.g., genomic DNA, e.g., cfDNA.

A polynucleotide can be uniquely identified in various ways. A polynucleotide can be uniquely identified by a unique DNA barcode. For example, any two polynucleotides in a sample are attached two different DNA barcodes. Moreover, a population of polynucleotides can be identified by DNA barcodes. For example, a first population of polynucleotides can be barcoded, while a second population of polynucleotides is not barcoded. Alternatively, a first population of polynucleotides can be tagged with a first barcode and a second population of polynucleotides can be tagged with a second barcode. A polynucleotide also can be uniquely identified by the combination of a DNA barcode and one or more endogenous sequences of the polynucleotide. For example, any two polynucleotides in a sample can be attached the same DNA barcode, but the two polynucleotides can still be identified by different endogenous sequences. The endogenous sequence can be on an end of a polynucleotide. For example, the endogenous sequence can be adjacent (e.g., base in between) to the attached DNA barcode. In some instances the endogenous sequence can be at least 2, 4, 6, 8, 10, 20, 30, 40, 50, 60, 70, 80, 90, or 100 bases in length. Preferably, the endogenous sequence is a terminal sequence of the fragment/polynucleotides to be analyzed. The endogenous sequence may be the length of the sequence. For example, a plurality of DNA barcodes comprising 8 different DNA barcodes can be attached to both ends of each polynucleotide in a sample. Each polynucleotide in the sample can be identified by the combination of the DNA barcodes and about 10 base pair endogenous sequence on an end of the polynucleotide. Without being bound by theory, the endogenous sequence of a polynucleotide can also be the entire polynucleotide sequence.

Also disclosed herein are compositions of tagged polynucleotides. The tagged polynucleotide can be single-stranded. Alternatively, the tagged polynucleotide can be double-stranded (e.g., duplex-tagged polynucleotides). Accordingly, the present also provides compositions of duplex-tagged polynucleotides. The polynucleotides can comprise any types of nucleic acids (DNA and/or RNA). The polynucleotides comprise any types of DNA disclosed herein. For example, the polynucleotides can comprise DNA, e.g., fragmented DNA or cfDNA. A set of polynucleotides in the composition that map to a mappable base position in a genome can be non-uniquely tagged, that is, the number of different identifiers can be at least 2 and fewer than the number of polynucleotides that map to the mappable base position. The number of different identifiers can also be at least 3, 4, 5, 6, 7, 8, 9, 10, 11, 12, 13, 14, 15, 16, 17, 18, 19, 20, 21, 22, 23, 24, 25 and fewer than the number of polynucleotides that map to the mappable base position.

In some instances, as a composition goes from about 1 ng to about 10 µg or higher, a larger set of different molecular barcodes can be used. For example, between 5 and 100 different library adaptors can be used to tag polynucleotides in a cfDNA sample.

The systems and methods disclosed herein may be used in applications that involve the assignment of molecular barcodes. The molecular barcodes can be assigned to any types of polynucleotides disclosed in the present disclosure. For example, the molecular barcodes can be assigned to cell-free polynucleotides (e.g., cfDNAs) and/or to genomic polynucleotides (e.g., gDNAs). Often, an identifier disclosed herein can be a barcode oligonucleotide that is used to tag the polynucleotide. The barcode identifier may be a nucleic acid oligonucleotide (e.g., a DNA oligonucleotide). The barcode identifier can be single-stranded. Alternatively, the barcode identifier can be double-stranded. The barcode identifier can be attached to polynucleotides using any method disclosed herein. For example, the barcode identifier can be attached to the polynucleotide by ligation using an enzyme. The barcode identifier can also be incorporated into the polynucleotide through PCR. In other cases, the reaction may comprise addition of a metal isotope, either directly to the analyte or by a probe labeled with the isotope. Generally, assignment of unique or non-unique identifiers or molecular barcodes in reactions of this disclosure may follow methods and systems described by, for example, U.S. patent applications 2001/0053519, 2003/0152490, 2011/0160078 and U.S. Pat. No. 6,582,908, each of which is entirely incorporated herein by reference.

Identifiers or molecular barcodes used herein may be completely endogenous whereby circular ligation of individual fragments may be performed followed by random shearing or targeted amplification. In this case, the combination of a new start and stop point of the molecule and the original intramolecular ligation point can form a specific identifier.

Identifiers or molecular barcodes used herein can comprise any types of oligonucleotides. In some cases, identifiers may be predetermined, random, or semi-random sequence oligonucleotides. Identifiers can be barcodes. For example, a plurality of barcodes may be used such that barcodes are not necessarily unique to one another in the plurality. Alternatively, a plurality of barcodes may be used such that each barcode is unique to any other barcode in the plurality. The barcodes can comprise specific sequences (e.g., predetermined sequences) that can be individually tracked. Further, barcodes may be attached (e.g., by ligation) to individual molecules such that the combination of the barcode and the sequence it may be ligated to creates a specific sequence that may be individually tracked. As described herein, detection of barcodes in combination with sequence data of beginning (start) and/or end (stop) portions of sequence reads can allow assignment of a unique identity to a particular molecule. The length or number of base pairs of an individual sequence read may also be used to assign a unique identity to such a molecule. As described herein, fragments from a single strand of nucleic acid having been assigned a unique identity, may thereby permit subsequent identification of fragments from the parent strand. In this way the polynucleotides in the sample can be uniquely or substantially uniquely tagged. A duplex tag can include a degenerate or semi-degenerate nucleotide sequence, e.g., a random degenerate sequence. The nucleotide sequence can comprise any number of nucleotides. For example, the nucleotide sequence can comprise 1 (if using a non-natural nucleotide), 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50 or more nucleotides. In a particular example, the sequence can comprise 7 nucleotides. In another example, the sequence can comprise 8 nucleotides. The sequence can also comprise 9 nucleotides. The sequence can comprise 10 nucleotides.

A barcode can comprise contiguous or non-contiguous sequences. A barcode that comprises at least 1, 2, 3, 4, 5 or more nucleotides is a contiguous sequence or non-contiguous sequence if the 4 nucleotides are uninterrupted by any other nucleotide. For example, if a barcode comprises the sequence TTGC, a barcode is contiguous if the barcode is TTGC. On the other hand, a barcode is non-contiguous if the barcode is TTXGC, where X is a nucleic acid base.

An identifier or molecular barcode can have an n-mer sequence which may be 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50 or more nucleotides in length. A tag herein can comprise any range of nucleotides in length. For example, the sequence can be between 2 to 100, 10 to 90, 20 to 80, 30 to 70, 40 to 60, or about 50 nucleotides in length.

The tag can comprise a double-stranded fixed reference sequence downstream of the identifier or molecular barcode. Alternatively, the tag can comprise a double-stranded fixed reference sequence upstream or downstream of the identifier or molecular barcode. Each strand of a double-stranded fixed reference sequence can be, for example, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50 nucleotides in length.

A library of polynucleotide molecules can be synthesized for use in sequencing. For example, a library of polynucleotides comprising a plurality of polynucleotide molecules that are each less than or equal to 100, 90, 80, 70, 60, 50, 45, 40, or 35 nucleic acid (or nucleotide) bases in length can be made. A plurality of polynucleotide molecules can be each less than or equal to 35 nucleic acid bases in length. A plurality of polynucleotide molecules can be each less than or equal to 30 nucleic acid bases in length. A plurality of polynucleotide molecules can also be less than or equal to 250, 200, 150, 100, or 50 nucleic acid bases. Additionally, the plurality of polynucleotide molecules can also be less than or equal to 100, 99, 98, 97, 96, 95, 94, 93, 92, 91, 90, 89, 88, 87, 86, 85, 84, 83, 82, 81, 80, 79, 78, 77, 76, 75, 74, 73, 72, 71, 70, 69, 68, 67, 66, 65, 64, 63, 62, 61, 60, 59, 58, 57, 56, 55, 54, 53, 52, 51, 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11, or 10 nucleic acid bases.

A library of polynucleotides comprising a plurality of polynucleotide molecules can also have distinct (with respect to each other) molecular barcode sequences (or molecular barcodes) with respect to at least 4 nucleic acid bases. A molecular barcode (also "barcode" or "identifier" herein) sequence is a nucleotide sequence that distinguishes one polynucleotide from another. In other embodiments, the polynucleotide molecules can also have different barcode sequences with respect to 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50 or more nucleic acid bases.

A library of polynucleotides comprising a plurality of polynucleotide molecules can also have a plurality of different barcode sequences. For example, a plurality of polynucleotide molecules can have at least 4 different molecular barcode sequences. In some cases, the plurality of polynucleotide molecules has from 2-100, 4-50, 4-30, 4-20, or 4-10 different molecular barcode sequences. The plurality of polynucleotides molecules can also have other ranges of different barcode sequences such as, 1-4, 2-5, 3-6, 4-7, 5-8, 6-9, 7-10, 8-11, 9-12, 10-13, 11-14, 12-15, 13-16, 14-17, 15-18, 16-19, 17-20, 18-21, 19-22, 20-23, 21-24, or 22-25 different barcode sequences. In other cases, a plurality of polynucleotide molecules can have at least 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 more different barcode sequences. In a particular example, the plurality library adapters comprise at least 8 different sequences.

The location of the different barcode sequences can vary within the plurality of polynucleotides. For example, the different barcode sequences can be within 20, 15, 10, 9, 8, 7, 6, 5, 4, 3, or 2 nucleic acid bases from a terminal end of a respective one of the plurality of polynucleotide molecules. In an example, a plurality of polynucleotide molecules has distinct barcode sequences that are within 10 nucleic acid bases from the terminal end. In another example, a plurality of polynucleotide molecules has distinct barcode sequences that are within 5 or 1 nucleic acid bases from the terminal end. In other instances, the distinct barcode sequences can be at the terminal end of a respective one of the plurality of polynucleotide molecules. Other variations include that the distinct molecular barcode sequences can be within 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, or more nucleic acid bases from a terminal end of a respective one of the plurality of polynucleotide molecules.

The terminal end of the plurality of polynucleotide molecules can be adapted for ligation to a target nucleic acid molecule. For example, the terminal end can be a blunt end. In some other cases, the terminal end is adapted for hybridization to a complementary sequence of a target nucleic acid molecule.

A library of polynucleotides comprising a plurality of polynucleotide molecules can also have an edit distance of at least 1. In some cases, the edit distance is with respect to individual bases of the plurality of polynucleotide molecules. In other cases, the plurality of polynucleotide molecules can have an edit distance of at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50 or more. The edit distance can be a Hamming distance.

In some cases, the plurality of polynucleotides does not contain sequencing adaptors. A sequence adaptor can be a polynucleotide that comprises a sequence that hybridizes to one or more sequencing adaptors or primers. A sequencing adaptor can further comprise a sequence hybridizing to a solid support, e.g., a flow cell sequence. The term "flow cell sequence" and its grammatical equivalents as used herein, refers to a sequence that permits hybridization to a substrate, for example, by way of a primer attached to the substrate. The substrate can be bead or a planar surface. In some embodiments, a flow cell sequence can allow a polynucleotide to attach to a flow cell or surface (e.g., surface of a bead, for example, an Illumina flow cell.

When a plurality of polynucleotide molecules does not contain sequencing adaptors or primers, each polynucleotide molecule of the plurality does not contain a nucleic acid sequence or other moiety that is adapted to permit sequencing of a target nucleic acid molecule with a given sequencing approach, such as Illumina, SOLiD, Pacific Biosciences, GeneReader, Oxford Nanopore, Complete Genomics, GnuBio, Ion Torrent, Oxford Nanopore or Genia. In some examples, when a plurality of polynucleotide molecules does not contain sequencing adaptors or primers, the plurality of polynucleotide molecules does not contain flow cell sequences. For example, the plurality of polynucleotide molecules cannot bind to flow cells, such as used in Illumina flow cell sequencers. However, these flow cell sequences, if desired, can be added to the plurality of polynucleotide molecules by methods such as PCR amplification or ligation. At this point, Illumina flow cell sequencers can be used. Alternatively, when the plurality of polynucleotide molecules does not contain sequencing adaptors or primers, the plurality of polynucleotide molecules does not contain hairpin shaped adaptors or adaptors for generating hairpin loops in a target nucleic acid molecule, such as Pacific Bioscience SMRTbell™ adaptors. However, these hairpin shaped adaptors, if desired, can be added to the plurality of polynucleotide molecules by methods such as PCR amplification or ligation. The plurality of polynucleotide molecules can be circular or linear.

A plurality of polynucleotide molecules can be double stranded. In some cases, the plurality of polynucleotide molecules can be single stranded, or can comprise hybridized and non-hybridized regions. A plurality of polynucleotide molecules can be non-naturally occurring polynucleotide molecules.

Adaptors can be polynucleotide molecules. The polynucleotide molecules can be Y-shaped, bubble-shaped or hairpin-shaped. A hairpin adaptor may contain a restriction site(s) or a Uracil containing base. Adaptors can comprise a complementary portion and a non-complementary portion. The non-complementary portion can have an edit distance (e.g., Hamming distance). For example, the edit distance can be at least 1, at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, at least 21, at least 22, at least 23, at least 24, at least 25, at least 26, at least 27, at least 28, at least 29, or at least 30. The complementary portion of the adaptor can comprise sequences that are selected to enable and/or promote ligation to a polynucleotide, e.g., a sequence to enable and/or promote ligation to a polynucleotide at a high yield.

A plurality of polynucleotide molecules as disclosed herein can be purified. In some cases, a plurality of polynucleotide molecules as disclosed herein can be isolated polynucleotide molecules. In other cases, a plurality of polynucleotide molecules as disclosed herein can be purified and isolated polynucleotide molecules.

In certain aspects, each of the plurality of polynucleotide molecules is Y-shaped or hairpin-shaped. Each of the plurality of polynucleotide molecules can comprise a different barcode. The different barcode can be a randomer in the complementary portion (e.g., double stranded portion) of the Y-shaped or hairpin-shaped adaptor. Alternatively, the different barcode can be in one strand of the non-complementary portion (e.g., one of the Y-shaped arms). As discussed above, the different barcode can be at least 1, 2, 3, 4, 5, 6, 7, 8, 9, 10, 11, 12, 13, 14, 15, 16, 17, 18, 19, 20, 21, 22, 23, 24, 25, or more (or any length as described throughout) nucleic acid bases, e.g., 7 bases. The barcode can be contiguous or non-contiguous sequences, as described above. The plurality of polynucleotide molecules is from 10 nucleic acid bases to 35 nucleic acid bases (or any length as described above) in length. Further, the plurality of polynucleotide molecules can comprise an edit distance (as described above), that is a Hamming distance. A plurality of polynucleotide molecules can have distinct barcode sequences that are within 10 nucleic acid bases from the terminal end.

In another aspect, a plurality of polynucleotide molecules can be sequencing adaptors. A sequencing adaptor can comprise a sequence hybridizing to one or more sequencing primers. A sequencing adaptor can further comprise a sequence hybridizing to a solid support, e.g., a flow cell sequence. For example, a sequencing adaptor can be a flow cell adaptor. The sequencing adaptors can be attached to one or both ends of a polynucleotide fragment. In another example, a sequencing adaptor can be hairpin shaped. For example, the hairpin shaped adaptor can comprise a complementary double-stranded portion and a loop portion, where the double-stranded portion can be attached (e.g., ligated) to a double-stranded polynucleotide. Hairpin shaped sequencing adaptors can be attached to both ends of a polynucleotide fragment to generate a circular molecule, which can be sequenced multiple times. A sequencing adaptor can be up to 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, or more bases from end to end. For example, a sequencing adaptor can be up to 70 bases from end to end. The sequencing adaptor can comprise 20-30, 20-40, 30-50, 30-60, 40-60, 40-70, 50-60, 50-70, bases from end to end. In a particular example, the sequencing adaptor can comprise 20-30 bases from end to end. In another example, the sequencing adaptor can comprise 50-60 bases from end to end. A sequencing adaptor can comprise one or more barcodes. For example, a sequencing adaptor can comprise a sample barcode. The sample barcode can comprise a pre-determined sequence. The sample barcodes can be used to identify the source of the polynucleotides. The sample barcode can be at least 1, 2, 3, 4, 5, 6, 7, 8, 9, 10, 11, 12, 13, 14, 15, 16, 17, 18, 19, 20, 21, 22, 23, 24, 25, or more (or any length as described throughout) nucleic acid bases, e.g., at least 8 bases. The barcode can be contiguous or non-contiguous sequences, as described above.

The plurality of polynucleotide molecules as described herein can be used as adaptors. Adaptors can comprise one or more identifiers. An adaptor can comprise an identifier with a random sequence. Alternatively, an adaptor can comprise an identifier with pre-determined sequences. Some adaptors can comprise an identifier with a random sequence and another identifier with a pre-determined sequence. The adaptors comprising identifiers can be double-stranded or single-stranded adaptors. The adaptors comprising identifiers can be Y-shaped adaptors. A Y-shaped adaptor can comprise one or more identifiers with a random sequence. The one or more identifiers can be on the hybrid portion and/or non-hybridized portion of the Y-shaped adaptor. A Y-shaped adaptor can comprise one or more identifiers with a pre-determined sequence. The one or more identifiers with pre-determined sequence can be on the hybridized portion and/or non-hybridized portion of the Y-shaped adaptor. A Y-shaped adaptor can comprise one or more identifiers with a random sequence and one or more identifiers with a pre-determined sequence. For example, the one or more identifiers with a random sequence can be on the hybridized portion of the Y-shaped adaptor and/or the non-hybridized portion of the Y-shaped adaptor. The one or more identifiers with a pre-determined sequence can be on the hybridized portion of the Y-shaped adaptor and/or the non-hybridized portion of the Y-shaped adaptor. In a particular example, a Y-shaped adaptor can comprise an identifier with a random sequence on its hybridized portion and an identifier with a pre-determined sequence on its non-hybridized portion. The identifiers can be in any length disclosed herein. For example, a Y-shaped adaptor can comprise an identifier with a random sequence of 7 nucleotides on its hybridized portion and an identifier with a pre-determined sequence of 8 nucleotides on its non-hybridized portion.

An adaptor can include a double-stranded portion with a molecular barcode and at least one or two single-stranded portion. For example, the adaptor can be Y-shaped and include a double-stranded portion and two single-stranded portions. The single-stranded portions can include sequences that are not complementary to one another.

The adaptor can include a terminal end that has a sequence that is selected to permit the adaptor to be efficiently (e.g., at an efficiency of at least about 20%, 30%, 40%, 50%) ligated or otherwise coupled to a polynucleotide. In some examples, terminal nucleotides in a double-stranded portion of an adaptor are selected from a combination of purines and pyrimidines to provide for efficient ligation.

In some examples, a set of library adaptors comprises a plurality of polynucleotide molecules (library adaptors) with molecular barcodes. The library adaptors are less than or equal to 80, 70, 60, 50, 45, or 40 nucleotide bases in length. The molecular barcodes can be at least 4 nucleotide bases in length, but may be from 4 to 20 nucleotide bases in length. The molecular barcodes can be different from one another and have an edit distance of at least 1, 2, 3, 4, or 5 between one another. The molecular barcodes are located at least 1, 2, 3, 4, 5, 10, or 20 nucleotide bases away from a terminal end of their respective library adaptors. In some cases, the at least one terminal base is identical in all of the library adaptors.

The library adaptors can be identical but for the molecular barcodes. For example, the library adaptors can have identical sequences but differ only with respect to nucleotide sequences of the molecular barcodes.

Each of the library adaptors can have a double stranded portion and at least one single-stranded portion. By "single stranded portion" is meant an area of non-complementarity or an overhang. In some cases, each of the library adaptors has a double-stranded portion and two single-stranded portions. The double-stranded portion can have a molecular barcode. In some cases, the molecular barcode is a randomer. Each of the library adaptors can further include a strand-identification barcode on a single-stranded portion. The strand-identification barcode can include at least 4 nucleotide bases, in some cases from 4 to 20 nucleotide bases.

In some examples, each of the library adaptors has a double-stranded portion with a molecular barcode and two single-stranded portions. The single-stranded portions may not hybridize to one another. The single-stranded portions may not be completely complementary to one another.

The library adaptors can have a sequence of terminal nucleotides in a double-stranded portion that are the same. The sequence of terminal nucleotides can be at least 2, 3, 4, 5 or 6 nucleotide bases in length. For example, one strand of a double-stranded portion of the library adaptor can have the sequence ACTT, TCGC, or TACC at the terminal end, while the other strand can have a complementary sequence. In some cases, such a sequence is selected to optimize the efficiency at which the library adaptors ligate to target polynucleotides. Such sequences can be selected to optimize a binding interaction between the ends of the library adaptors and the target polynucleotides.

In some cases, none of the library adaptors contains a sample identification motif (or sample molecular barcode). Such sample identification motif can be provided via sequencing adaptors. A sample identification motif can include a sequencer of at least 4, 5, 6, 7, 8, 9, 10, 20, 30, or 40 nucleotide bases that permits the identification of polynucleotide molecules from a given sample from polynucleotide molecules from other samples. For example, this can permit polynucleotide molecules from two subjects to be sequenced in the same pool and sequence reads for the subjects subsequently identified.

A sequencer motif includes nucleotide sequence(s) needed to couple a library adaptor to a sequencing system and sequence a target polynucleotide coupled to the library adaptor. The sequencer motif can include a sequence that is complementary to a flow cell sequence and a sequence (sequencing initiation sequence) that is selectively hybridizable to a primer (or priming sequence) for use in sequencing. For example, such sequencing initiation sequence can be complementary to a primer that is employed for use in sequence by synthesis (e.g., Illumina). Such primer can be included in a sequencing adaptor. A sequencing initiation sequence can be a primer hybridization site.

In some cases, none of the library adaptors contains a complete sequencer motif. The library adaptors can contain partial or no sequencer motifs. In some cases, the library adaptors include a sequencing initiation sequence. The library adaptors can include a sequencing initiation sequence but no flow cell sequence. The sequence initiation sequence can be complementary to a primer for sequencing. The primer can be a sequence specific primer or a universal primer. Such sequencing initiation sequences may be situated on single-stranded portions of the library adaptors. As an alternative, such sequencing initiation sequences may be priming sites (e.g., kinks or nicks) to permit a polymerase to couple to the library adaptors during sequencing.

In some cases, partial or complete sequencer motifs are provided by sequencing adaptors. A sequencing adaptor can include a sample molecular barcode and a sequencer motif. The sequencing adaptors can be provided in a set that is separate from the library adaptors. The sequencing adaptors in a given set can be identical—i.e., they contain the same sample barcode and sequencer motif.

Sequencing adaptors can include sample identification motifs and sequencer motifs. Sequencer motifs can include primers that are complementary to a sequencing initiation sequence. In some cases, sequencer motifs also include flow cell sequences or other sequences that permit a polynucleotide to a configured or arranged in a manner that permits the polynucleotide to be sequenced by a sequencer.

Library adaptors and sequencing adaptors can each be partial adaptors, that is, containing part but not all of the sequences necessary to enable sequencing by a sequencing platform. Together they provide complete adaptors. For example, library adaptors can include partial or no sequencer motifs, but such sequencer motifs are provided by sequencing adaptors.

As described above, sequence reads or consensus sequences can be mapped to one or more selected genetic loci. A genetic locus can be, for example, a specific nucleotide position in the genome, a sequence of nucleotides (for example, an open reading frame), a fragment of a chromosome, a whole chromosome, or an entire genome. A genetic locus can be a polymorphic locus. Polymorphic locus can be a locus at which sequence variation exists in the population and/or exists in a subject and/or a sample. A polymorphic locus can be generated by two or more distinct sequences coexisting at the same location of the genome. The distinct sequences can differ from one another by one or more nucleotide substitutions, a deletion/insertion, and/or a duplication of any number of nucleotides, generally a relatively small number of nucleotides, such as less than 50, 45, 40, 35, 30, 25, 24, 23, 22, 21, 20, 19, 18, 17, 16, 15, 14, 13, 12, 11, 10, 9, 8, 7, 6, 5, 4, 3, 2, or 1 nucleotide(s), among others. A polymorphic locus can be created by a single nucleotide position that varies within the population, e.g. a single nucleotide variation (SNV) or a single nucleotide polymorphism (SNP).

A reference genome for mapping can include the genome of any species of interest. Human genome sequences useful as references can include the hg19 assembly, GRCh38.p4, or any previous or available hg assembly. Such sequences can be interrogated using the genome browser available at genome.ucsc.edu/index.html. Other species genomes include, for example PanTro2 (chimp) and mm9 (mouse).

In some embodiments, the methods disclosed herein can also comprise grouping sequence reads. Sequence reads can be grouped based on various types of sequences, e.g., sequences of an oligonucleotide tag (e.g., a barcode), sequence of a polynucleotide fragments, or combinations thereof.

In some embodiments, the methods disclosed herein also comprise quantifying sequence reads. For example, sequences mapping to a selected genetic locus, or to each of a plurality of selected genetic loci, are quantified, e.g., counted.

In some embodiments, cell-free DNA from a subject is sequenced and one or more genetic variants are detected and quantified. For example, the relative amount of total reads (number of read counts) mapping to a locus that contain the variant is determined. If the relative amount is consistent with homozygosity, one can have high confidence that the variant is present in the germline. Such an amount could be, for example, above 95%, above 96%, above 97%, above 98%, above 99%, or 100%. This call can be compared with a determined genotype for confirmation.

If the relative amount is inconsistent with a homozygous or heterozygous genotype at the locus, one can have high confidence that the variant the result of a somatic mutation and is not present in the germline. Such an amount could be, for example, below 30%, below 25%, below 20%, below 15%, below 10%, below 9%, below 8%, below 7%, below 6%, below 5%, below 4%, below 3%, below 2%, or below 1%. Again, this call can be compared with a determined genotype for confirmation.

Alternatively, the relative amount can be consistent with heterozygosity at the locus. Such an amount could be, for example, between 30% and 70%, e.g., between 40% and 60%, between 45% and 55%, between 46% and 54%, between 47% and 53%, between 48% and 52%, or between 49% and 51%. In some embodiments, the probable germline genotype (e.g., as obtained from gDNA) of the subject at the locus is determined. In some embodiments, the genotype is compared with the identity of the variant found in the cell-free DNA. In certain embodiments, if the genotype is homozygous, then one can conclude with high confidence that the variant represents a somatic mutation, and most likely in high amounts. If the genotype is determined to be heterozygous, and the variant is consistent with one of the heterozygous alleles, then one may conclude that the variant is not a somatic mutation, but represents heterozygosity in the germline genotype.

In some embodiments, a homozygous genotype can be ruled out with high confidence but a heterozygous genotype cannot be determined high confidence, resulting in a potentially ambiguous genotype. For example the variant may be measured on the genomic DNA at an extreme end of the range, e.g., at 30%. In such a case, one may not be able to determine, with high confidence, whether the amount of variant detected in the cfDNA is or is not more likely to represent a somatic mutation or germline heterozygosity. Such a measurement may arise when an abundance of DNA containing the somatic mutation is present in a sample because of, for example, the rapid growth of tumor cells. It should be noted that at any measured level, there is some probability that a variant detected in the genomic DNA does not represent heterozygosity. However, between 30% and 70% detection of a variant in the germline most likely represents heterozygosity, and the variant detected in cfDNA can be measured against this.

In such cases, other information can be used in Bayesian fashion to increase or decrease the probability that a variant in the cfDNA represents a somatic mutation or heterozygosity in the germline. For example, population studies can indicate the prevalence of a variant in the germline of various groups, e.g., based in genetic ancestry. So, for example, if one has low confidence in calling a heterozygous genotype in an individual, and the variant is found at high incidence in the persons sharing the subject's genetic ancestry, then one can determine with higher confidence that the person is, indeed, heterozygous and that the variant in the cfDNA does not represent a somatic mutation. Conversely, if the variant is found at only very low incidence in the persons sharing the subject's genetic ancestry, then one can determine with higher confidence that the person is not heterozygous and that the variant in the cfDNA represents a somatic mutation.

This disclosure contemplates several ways to determine whether an amount (e.g., of read counts) is consistent or inconsistent with a heterozygous genotype. In some embodiments, cutoff values are used. For example, a cutoff of 30% of the total read counts for a particular genetic variant at a locus can be set. In some embodiments, values below the cutoff amount are presumed to represent somatic mutations. In some embodiments, values above the cutoff amount, and, typically below a cutoff for homozygosity, may be presumed to be consistent with heterozygosity and, therefore, require further analysis before calling the variant as a somatic mutation.

In some embodiments, a probabilistic function (e.g., a Bayesian function) is used to calculate a probability that an amount represents heterozygosity. Probabilities above certain levels can trigger the comparison genotype.

In some embodiments, the determination of a genotype is made as a routine part of the analysis. In some embodiments, the determination of a genotype is determined only if an abundance of a variant is consistent with an interpretation of heterozygosity.

FIG. 1 shows an exemplary system for the identification of a somatic mutant versus germline variants for cell-free DNA variant calling applications. The system receives bodily fluid samples from a cancer subject. The samples can include, for example, blood, serum, plasma, urine, cerebrospinal fluid, saliva, stool, lymph fluid, synovial fluid, cystic fluid, ascites, pleural effusion, amniotic fluid, chorionic villus sample, fluid from a preimplantation embryo, a placental sample, lavage and cervical vaginal fluid, interstitial fluid, a buccal swab sample, sputum, bronchial lavage, a Pap smear sample, or ocular fluid. In some embodiments, information derived from the methods of the present disclosure can be combined with other clinical information. Other clinical information for a cancer subject includes the results of laboratory tests, imaging or medical procedure directed towards the specific cancer that one of ordinary skill in the art can readily identify. The list of appropriate sources of clinical information for cancer includes, but is not limited to, CT scan, MRI scan, ultrasound scan, bone scan, PET Scan, bone marrow test, barium X-ray, endoscopy, lymphangiogram, IVU (Intravenous urogram) or IVP (IV pyelogram), lumbar puncture, cystoscopy, immunological tests (anti-malignin antibody screen), and cancer marker tests.

As depicted in FIG. 1, a small amount of genomic DNA (gDNA) is added to the mixture in the assay preparation operation for example (10). In some embodiments, gDNA's fragment length is higher than the main/first mode of the cfDNA fragment length distribution (168 bases), in embodiments where 168 is the mode. In preferred embodiments, the distribution is higher than the 99th percentile of the distribution of the first mode, which is around 220 to 240 bases. Similarly, for the second mode, i.e., it should be above 2*220 to 2*240 bases.

In some embodiments, gDNA is larger than the second mode (2*168=336 bases) of the cfDNA length distribution. Without a loss of continuity, for the present disclosure, we assume the length of the gDNA is 400+ bases, keeping in mind that smaller lengths would also work, but as it starts getting closer to the lengths supported by the cfDNA (the first and to a lesser degree the second mode), the probability of error increases.

The addition of the gDNA could be implicit. Normally, a process is applied by which the gDNA that normally exists in the serum is filtered out, heavily, in order to render only the cfDNA in the solution. By reducing the filtering efficiency, one could achieve the above objective (implicitly adding gDNA) without having a need to spike in gDNA.

In certain embodiments, gDNA is added to a sample containing cfDNA by allowing cellular gDNA to remain in a sample. For example, a sample can be centrifuged to separate a cell-free component, and cells spiked back into the cell-free component to add gDNA. Alternatively, the efficiency of centrifugation can be reduced so as to allow some cells to remain in a sample, implicitly adding gDNA.

Alternatively, germline DNA of any size can be used. In this case, the DNA can bear a tag that distinguishes it from the cell-free DNA.

Only a small amount of gDNA is required to enable the present disclosure. In some embodiments, 5% gDNA is added to the mix. In certain embodiments, smaller amounts (e.g., less than 5%, less than 4%, less than 3%, less than 2%, or less than 1%) are added to the mix. Smaller amounts may maximize the numbers of cfDNA reads given a constant read budget, e.g., a multiplexed flowcell.

Next, as described in FIG. 1, variant discovery may be performed in one embodiment (12). Other embodiments may also be applied to make this process more robust (e.g., using fuzzy logic) and potentially more advantageous. However, any number of mutation/variant discovery techniques can be applied.

Once a variant is discovered, the supporting reads/molecules are interrogated for their lengths (14). The process determines if it is from germline source if the support for the variant includes reads from gDNA (16). Otherwise, if there are no evidence of having at least 1 or a few reads supporting the variant coming from the gDNA source, then the variant would be labeled as a somatic mutation (18).

In some embodiments, the process classifies the variant as from germ line source if gDNA molecules have longer length than those derived from cfDNA. In some embodiments, the process classifies variant as from somatic source if gDNA molecules have shorter length than those derived from cfDNA. In addition to or as an alternative to using DNA molecule length to categorize DNA as cfDNA or gDNA, tags may be used to differentiate cfDNA and gDNA.

Next, exemplary operations of the process of FIG. 1 are detailed. In one example, suppose the reference base is A and the mutant base is G, and that A has 1000 supporting molecules and G has only 3. The operation of FIG. 1 in this example is as follows: If the variant is germline, some of the mutant molecules should be derived from the germline cells (which have the same source as the gDNA). Therefore, the mutant base (here, G) must get support from gDNA. This can be checked as gDNA molecules generally have a higher length than those derived from cfDNAs. Therefore, for example, if there are 2 molecules of gDNA (corresponding to reads that are longer, e.g., 400+ bases), then the system could infer that the variant is from the gDNA source. However, if no such support is observed, the system infers that the variant is a mutation from a somatic source. In other words, the somatic vs. germline ambiguity has been fully resolved.

This method can be combined with any method used in prior art (e.g., using genomic and/or cancer-based databases) or other disclosures in order to increase the accuracy of the calls.

Knowing the fact that the somatic mutations (that are real) could also have allelic ratios like the above (in the ideal or nominal case) would make cfDNA (allelic) ratio an unreliable source for detection of somatic mutations (and distinguishing them from germline variants). For instance, if the allelic ratio for the variant is 50% or close to it, one may not be able to distinguish whether the source of variant is somatic or germline. The process prevents the ambiguity—by applying the process of FIG. 1, one could clearly identify the true source of variation, despite the observed allelic ratio. This above process is applicable to somatic mutation detection methods where a large background (germline). In one embodiment, the system uses Guardant360's single nucleotide variant (SNV) detection process.

In one embodiment, a lab using the process of FIG. 1 generates reports to be signed by a lab director. The lab director can examine reports generated by the lab's test equipment. In one embodiment, the lab director can convene a tumor board to review reports which include a mixture of germline SNPs and somatic cancer mutations, and marks the somatic cancer mutations for test reports. The tumor board can be an actual panel of experts composed of oncologists, pathologists, radiologists, and other experts who review various types of data for individual patient cases in detail before making a treatment recommendation. The tumor board can include clinical geneticists who evaluate genetic test data for cancer patients. The tumor board recommends that certain variants be reported, which are then passed to the lab director using a laboratory information management system (LIMS) system. The lab director reviews the calls made by tumor board and verifies those calls that should be reported and signs the report for release to the client. The system automates some of the tumor board function to facilitate and streamline the reporting process to handle the large number of samples. The tumor board automation also improves the overall accuracy of the mutation calls. The set of procedures ("tumor board function") described below correctly annotates the somatic, cancer-associated variants similar to how they would be considered and marked by the human tumor board. The automated tumor board process can be embedded directly in the LIMS system for full automation.

In some embodiments, the methods of the present disclosure reduce error rates and bias that can be orders of magnitude higher than what is required to reliably detect de novo genomic alterations associated with cancer. In some embodiments, the methods first capture genetic information by collecting body fluid samples as sources of genetic material (blood, saliva, sweat, among others), followed by sequencing the materials. For example, polynucleotides in a sample can be sequenced, producing a plurality of sequence reads. The tumor burden in a sample that comprises polynucleotides can be estimated as the relative number of sequence reads bearing a variant, to the total number of sequence reads generated from the sample. Also, in the case of copy number variants, the tumor burden can be estimated as the relative excess (in the case of gene duplication) or relative deficit (in the case of gene elimination) of total number of sequence reads at test and control loci. So, for example, a run may produce 1000 reads mapping to an oncogene locus, of which 900 correspond to wild type and 100 correspond to a cancer mutant, indicating a copy number variant at this gene. Next, genetic information is processed and genetic variants are identified. Genetic variants include sequence variants, copy number variants and nucleotide modification variants. A sequence variant is a variation in a genetic nucleotide sequence. A copy number variant is a deviation from wild type in the number of copies of a portion of a genome. Genetic variants include, for example, single nucleotide variations (SNPs), insertions, deletions, inversions, transversions, translocations, gene fusions, chromosome fusions, gene truncations, copy number variations (e.g., aneuploidy, partial aneuploidy, polyploidy, gene amplification), abnormal changes in nucleic acid chemical modifications, abnormal changes in epigenetic patterns and abnormal changes in nucleic acid methylation. The process then determines the frequency of genetic variants in the sample containing the genetic material. Since this process is noisy, the process separates information from noise.

The sequencing methods have error rates. For example, the mySeq system of Illumina can produce percent error rates in the low single digits. Thus, for 1000 sequence reads mapping to a locus, one might expect about 50 reads (about 5%) to include errors. Certain methodologies, such as those described in WO 2014/149134 (Talasaz and Eltoukhy) can significantly reduce the error rate. Errors create noise that can obscure signals from cancer present at low levels in a sample. Thus, if a sample has a tumor burden at a level around the sequencing system error rate, e.g., around 0.1%-5%, it may be difficult to distinguish a signal corresponding to a genetic variant due to cancer from one due to noise.

Diagnosis of cancer can be done by analyzing the genetic variants, even in the presence of noise. The analysis can be based on the frequency of sequence variants or level of CNV and a diagnosis confidence indication or level for detecting genetic variants in the noise range can be established. Next, the process increases the diagnosis confidence. This can be done using a plurality of measurements to increase confidence of diagnosis, or alternatively using measurements at a plurality of time points to determine whether cancer is advancing, in remission or stabilized. The diagnostic confidence can be used to identify disease states. For example, cell free polynucleotides taken from a subject can include polynucleotides derived from normal cells, as well as polynucleotides derived from diseased cells, such as cancer cells. Polynucleotides from cancer cells may bear genetic variants, such as somatic cell mutations and copy number variants. When cell free polynucleotides from a sample from a subject are sequenced, these cancer polynucleotides are detected as sequence variants or as copy number variants. The relative amount of tumor polynucleotides in a sample of cell free polynucleotides is referred to as the "tumor burden."

Measurements of a parameter, whether or not they are in the noise range, may be provided with a confidence interval. Tested over time, one can determine whether a cancer is advancing, stabilized or in remission by comparing confidence intervals over time. Where the confidence intervals do not overlap, this indicates the direction of disease.

Next, the process generates genetic Report/Diagnosis. The process receives germline SNP and somatic cancer mutations and mark somatic cancer mutations and generates a report to annotate somatic mutations similar to human tumor board analysis and provide treatment options to be reviewed and approved by the lab director.

Turning now to the process for generating tumor board recommendations, in some embodiments, the system uses data from cBio portal SNVs for the 68 genes in GH2.7, where GH2.7 is Guardant Health's panel and related testing processes released February 2015 (Guardant360 test) panel. The cBioPortal for Cancer Genomics provides a Web resource (cbioportal.org) for exploring, visualizing, and analyzing multidimensional cancer genomics data. The portal reduces molecular profiling data from cancer tissues and cell lines into readily understandable genetic, epigenetic, gene expression, and proteomic events. The query interface combined with customized data storage enables researchers to interactively explore genetic alterations across samples, genes, and pathways and, when available in the underlying data, to link these to clinical outcomes. The portal provides graphical summaries of gene-level data from multiple platforms, network visualization and analysis, survival analysis, patient-centric queries, and software programmatic access. The system provides variant-level calls as well as sample-level calls in determining whether the director 3 should review the test in depth.

Numerous cancers may be detected using the methods and systems described herein. Cancers cells, as most cells, can be characterized by a rate of turnover, in which old cells die and replaced by newer cells. Generally dead cells, in contact with vasculature in a given subject, may release DNA or fragments of DNA into the blood stream. This is also true of cancer cells during various stages of the disease. Cancer cells may also be characterized, dependent on the stage of the disease, by various genetic aberrations such as copy number variation as well as mutations. This phenomenon may be used to detect the presence or absence of cancers individuals using the methods and systems described herein.

In some embodiments, the methods of the present disclosure can be used to diagnose a disease or condition such as cancer or an inflammatory condition. The term "diagnosis" as used herein refers to methods by which the skilled worker can estimate and/or determine whether or not a patient is suffering from a given disease or condition. In some embodiments, the methods of the present disclosure can be used in the prognosis if a disease of a disease or condition such as cancer or an inflammatory condition. The term "prognosis" as used herein refers to the likelihood of a disease or condition progression, including recurrence of a disease or condition. In some embodiments, the methods of the present disclosure can be used to assess the risk of developing a disease or condition such as cancer or an inflammatory condition. In some embodiments, the methods of the present disclosure can be used to assess the efficacy of treatment of a disease or condition such as cancer or an inflammatory condition. For example, the methods of the present disclosure can be used before and after treating a patient with the disease or condition (e.g., before and after administering a drug such as a chemotherapeutic agent). In some embodiments, the methods of the present disclosure can be used to monitor the progression or regression of a disease or condition such as cancer or an inflammatory condition. For example, the methods of the present disclosure can be performed at different time points to monitor the progression or regression. In some embodiments, the methods of the present disclosure can be used to identify a compound for ameliorating or treating a disease or condition such as cancer or an inflammatory condition. For example, the methods of the present disclosure can be used before and after administering the compound to determine whether the compound ameliorates or treats the disease.

As used herein, "treating" a disease or condition refers to taking steps to obtain beneficial or desired results, including clinical results. Beneficial or desired clinical results include, but are not limited to, alleviation or amelioration of one or more symptoms associated with diseases or conditions. As used herein, "administering" or "administration of" a compound or an agent to a subject can be carried out using one of a variety of methods known to those skilled in the art. For example, a compound or an agent can be administered, intravenously, arterially, intradermally, intramuscularly, intraperitonealy, intravenously, subcutaneously, ocularly, sublingually, orally (by ingestion), intranasally (by inhalation), intraspinally, intracerebrally, and transdermally (by absorbtion, e.g., through a skin duct). A compound or agent can also appropriately be introduced by rechargeable or biodegradable polymeric devices or other devices, e.g., patches and pumps, or formulations, which provide for the extended, slow, or controlled release of the compound or agent. Administering can also be performed, for example, once, a plurality of times, and/or over one or more extended periods. In some aspects, the administration includes both direct administration, including self-administration, and indirect administration, including the act of prescribing a drug. For example, as used herein, a physician who instructs a patient to self-administer a drug, or to have the drug administered by another and/or who provides a patient with a prescription for a drug is administering the drug to the patient. In some embodiments, a compound or an agent is administered orally, e.g., to a subject by ingestion, or intravenously, e.g., to a subject by injection. In some embodiments, the orally administered compound or agent is in an extended release or slow release formulation, or administered using a device for such slow or extended release.

In some embodiments, blood from subjects at risk for cancer may be drawn and prepared as described herein to generate a population of cell free polynucleotides. In one example, this might be cell-free DNA. The systems and methods of the disclosure may be employed to detect mutations or copy number variations that may exist in certain cancers present. The method may help detect the presence of cancerous cells in the body, despite the absence of symptoms or other hallmarks of disease.

As used herein, the term "cancer" includes, but is not limited to, various types of malignant neoplasms, most of which can invade surrounding tissues, and may metastasize to different sites (see, for example, PDR Medical Dictionary, 1st edition (1995), incorporated herein by reference in its entirety for all purposes). The terms "neoplasm" and "tumor" refer to an abnormal tissue that grows by cellular proliferation more rapidly than normal and continues to grow after the stimuli that initiated proliferation is removed. Such abnormal tissue shows partial or complete lack of structural organization and functional coordination with the normal tissue which may be either benign (such as a benign tumor) or malignant (such as a malignant tumor). Examples of general categories of cancer include, but are not limited to, carcinomas (malignant tumors derived from epithelial cells such as, for example, common forms of breast, prostate, lung and colon cancer), sarcomas (malignant tumors derived from connective tissue or mesenchymal cells), lymphomas (malignancies derived from hematopoietic cells), leukemias (malignancies derived from hematopoietic cells), and germ cell tumors (tumors derived from totipotent cells, in adults most often found in the testicle or ovary; in fetuses, babies and young children, most often found on the body midline, particularly at the tip of the tailbone), blastic tumors (a typically malignant tumor which resembles an immature or embryonic tissue) and the like. Examples of the types of neoplasms intended to be encompassed by the present disclosure include but are not limited to those neoplasms associated with cancers of neural tissue, blood forming tissue, breast, skin, bone, prostate, ovaries, uterus, cervix, liver, lung, brain, larynx, gallbladder, pancreas, rectum, parathyroid, thyroid, adrenal gland, immune system, head and neck, colon, stomach, bronchi, and/or kidneys. In particular embodiments, types and number of cancers that may be detected include, but are not limited to, blood cancers, brain cancers, lung cancers, skin cancers, nose cancers, throat cancers, liver cancers, bone cancers, lymphomas, pancreatic cancers, skin cancers, bowel cancers, rectal cancers, thyroid cancers, bladder cancers, kidney cancers, mouth cancers, stomach cancers, solid state tumors, heterogeneous tumors, homogenous tumors and the like.

In some embodiments, the system and methods may be used to detect any number of genetic aberrations that may cause or result from cancers. These may include but are not limited to mutations, mutations, indels, copy number variations, transversions, translocations, inversion, deletions, aneuploidy, partial aneuploidy, polyploidy, chromosomal instability, chromosomal structure alterations, gene fusions, chromosome fusions, gene truncations, gene amplification, gene duplications, chromosomal lesions, DNA lesions, abnormal changes in nucleic acid chemical modifications, abnormal changes in epigenetic patterns, abnormal changes in nucleic acid methylation infection and cancer.

Additionally, the systems and methods described herein may also be used to help characterize certain cancers. Genetic data produced from the system and methods of this disclosure can allow practitioners to help better characterize a specific form of cancer. Often times, cancers are heterogeneous in both composition and staging. Genetic profile data may allow characterization of specific sub-types of cancer that may be important in the diagnosis or treatment of that specific sub-type. This information may also provide a subject or practitioner clues regarding the prognosis of a specific type of cancer.

In some embodiments, the systems and methods provided herein are used to monitor already known cancers, or other diseases in a particular subject. This may allow a subject or a practitioner to adapt treatment options in accord with the progress of the disease. In this example, the systems and methods described herein may be used to construct genetic profiles of a particular subject of the course of the disease. In some instances, cancers can progress, becoming more aggressive and genetically unstable. In other examples, cancers may remain benign, inactive or dormant. The system and methods of this disclosure may be useful in determining disease progression.

Further, the systems and methods described herein may be useful in determining the efficacy of a particular treatment option. In some embodiments, successful treatment options may actually increase the amount of copy number variation or mutations detected in subject's blood if the treatment is successful as more cancers may die and shed DNA. In other embodiments, this may not occur. In some embodiments, certain treatment options are correlated with genetic profiles of cancers over time. This correlation may be useful in selecting a therapy. Additionally, if a cancer is observed to be in remission after treatment, the systems and methods described herein may be useful in monitoring residual disease or recurrence of disease.

The methods and systems described herein are not limited to detection of mutations and copy number variations associated with only cancers. Various other diseases and infections may result in other types of conditions that may be suitable for early detection and monitoring. For example, in certain cases, genetic disorders or infectious diseases may cause a certain genetic mosaicism within a subject. This genetic mosaicism may cause copy number variation and mutations that could be observed. In some embodiments, the system and methods of the disclosure may also be used to monitor the genomes of immune cells within the body. Immune cells, such as B cells, may undergo rapid clonal expansion upon the presence certain diseases. Clonal expansions may be monitored using copy number variation detection and certain immune states may be monitored. In this example, copy number variation analysis may be performed over time to produce a profile of how a particular disease may be progressing.

In some embodiments, the methods of the present disclosure are applicable to autoimmune or immune-related diseases or conditions. As used herein, "autoimmune or immune-related disease or condition" can refer to any disease, disorder, or condition affecting or associated with the immune system. Examples of autoimmune or immune-related diseases or conditions include, but are not limited to, inflammation, antiphospholipid syndrome, systemic lupus erythematosus, rheumatoid arthritis, autoimmune vasculitis, celiac disease, autoimmune thyroiditis, post-transfusion immunization, maternal-fetal incompatibility, transfusion reactions, immunological deficiency such IgA deficiency, common variable immunodeficiency, drug-induced lupus, diabetes mellitus, Type I diabetes, Type II diabetes, juvenile onset diabetes, juvenile rheumatoid arthritis, psoriatic arthritis, multiple sclerosis, immunodeficiency, allergies, asthma, psoriasis, atopic dermatitis, allergic contact dermatitis, chronic skin diseases, amyotrophic lateral sclerosis, chemotherapy-induced injury, graft-vs-host diseases, bone marrow transplant rejection, Ankylosing spondylitis, atopic eczema, Pemphigus, Behcet's disease, chronic fatigue syndrome fibromyalgia, chemotherapy-induced injury, myasthenia gravis, glomerulonephritis, allergic retinitis, systemic sclerosis, subacute cutaneous lupus erythematosus, cutaneous lupus erythematosus including chilblain lupus erythematosus, Sjogren's syndrome, autoimmune nephritis, autoimmune vasculitis, autoimmune hepatitis, autoimmune carditis, autoimmune encephalitis, autoimmune mediated hematological diseases, lc-SSc (limited cutaneous form of scleroderma), dc-SSc (diffused cutaneous form of scleroderma), autoimmune thyroiditis (AT), Grave's disease (GD), myasthenia gravis, multiple sclerosis (MS), ankylo sing spondylitis, transplant rejection, immune aging, rheumatic/autoimmune diseases, mixed connective tissue disease, spondyloarthropathy, psoriasis, psoriatic arthritis, myositis, scleroderma, dermatomyositis, autoimmune vasculitis, mixed connective tissue disease, idiopathic thrombocytopenic purpura, Crohn's disease, human adjuvant disease, osteoarthritis, juvenile chronic arthritis, a spondyloarthropathy, an idiopathic inflammatory myopathy, systemic vasculitis, sarcoidosis, autoimmune hemolytic anemia, autoimmune thrombocytopenia, thyroiditis, immune-mediated renal disease, a demyelinating disease of the central or peripheral nervous system, idiopathic demyelinating polyneuropathy, Guillain-Barre syndrome, a chronic inflammatory demyelinating polyneuropathy, a hepatobiliary disease, infectious or autoimmune chronic active hepatitis, primary biliary cirrhosis, granulomatous hepatitis, sclerosing cholangitis, inflammatory bowel disease, gluten-sensitive enteropathy, Whipple's disease, an autoimmune or immune-mediated skin disease, a bullous skin disease, erythema multiforme, allergic rhinitis, atopic dermatitis, food hypersensitivity, urticaria, an immunologic disease of the lung, eosinophilic pneumonias, idiopathic pulmonary fibrosis, hypersensitivity pneumonitis, a transplantation associated disease, graft rejection or graft-versus-host-disease, psoriatic arthritis, psoriasis, dermatitis, polymyositis/dermatomyositis, toxic epidermal necrolysis, systemic scleroderma and sclerosis, responses associated with inflammatory bowel disease, Crohn's disease, ulcerative colitis, respiratory distress syndrome, adult respiratory distress syndrome (ARDS), meningitis, encephalitis, uveitis, colitis, glomerulonephritis, allergic conditions, eczema, asthma, conditions involving infiltration of T cells and chronic inflammatory responses, atherosclerosis, autoimmune myocarditis, leukocyte adhesion deficiency, allergic encephalomyelitis, immune responses associated with acute and delayed hypersensitivity mediated by cytokines and T-lymphocytes, tuberculosis, sarcoidosis, granulomatosis including Wegener's granulomatosis, agranulocytosis, vasculitis (including ANCA), aplastic anemia, Diamond Blackfan anemia, immune hemolytic anemia including autoimmune hemolytic anemia (AIHA), pernicious anemia, pure red cell aplasia (PRCA), Factor VIII deficiency, hemophilia A, autoimmune neutropenia, pancytopenia, leukopenia, diseases involving leukocyte diapedesis, central nervous system (CNS) inflammatory disorders, multiple organ injury syndrome, mysathenia gravis, antigen-antibody complex mediated diseases, anti-glomerular basement membrane disease, anti-phospholipid antibody syndrome, allergic neuritis, Bechet disease, Castleman's syndrome, Goodpasture's syndrome, Lambert-Eaton Myasthenic Syndrome, Reynaud's syndrome, Sjorgen's syndrome, Stevens-Johnson syndrome, pemphigoid bullous, pemphigus, autoimmune polyendocrinopathies, Reiter's disease, stiff-man syndrome, giant cell arteritis, immune complex nephritis, IgA nephropathy, IgM polyneuropathies or IgM mediated neuropathy, idiopathic thrombocytopenic purpura (ITP), thrombotic throbocytopenic purpura (TTP), autoimmune thrombocytopenia, autoimmune disease of the testis and ovary including autoimmune orchitis and oophoritis, primary hypothyroidism, autoimmune endocrine diseases including autoimmune thyroiditis, chronic thyroiditis (Hashimoto's Thyroiditis), subacute thyroiditis, idiopathic hypothyroidism, Addison's disease, Grave's disease, autoimmune polyglandular syndromes (or polyglandular endocrinopathy syndromes), Sheehan's syndrome, autoimmune hepatitis, lymphoid interstitial pneumonitis (HIV), bronchiolitis obliterans (non-transplant) vs NSIP, Guillain-Barre' Syndrome, large vessel vasculitis (including polymyalgia rheumatica and giant cell (Takayasu's) arteritis), medium vessel vasculitis (including Kawasaki's disease and polyarteritis nodosa), ankylosing spondylitis, Berger's disease (IgA nephropathy), rapidly progressive glomerulonephritis, primary biliary cirrhosis, Celiac sprue (gluten enteropathy), cryoglobulinemia, and amyotrophic lateral sclerosis (ALS). In certain embodiments, the methods of the present disclosure are applicable to inflammatory conditions including, but not limited to, asthma, multiple sclerosis (e.g., relapsing remitting multiple sclerosis and secondary progressive multiple sclerosis), arthritis (e.g., rheumatoid arthritis, osteoarthritis, and psoriatic arthritis), lupus erythematosus, and psoriasis.

In some embodiments, the systems and methods of this disclosure can be used to monitor systemic infections themselves, as may be caused by a pathogen such as a bacteria or virus. Copy number variation or even mutation detection may be used to determine how a population of pathogens are changing during the course of infection. This may be particularly important during chronic infections, such as HIV/AIDS or Hepatitis infections, whereby viruses may change life cycle state and/or mutate into more virulent forms during the course of infection.

In some embodiments, the system and methods of this disclosure can be used for monitoring transplant subjects. Generally, transplanted tissue undergoes a certain degree of rejection by the body upon transplantation. The methods of this disclosure may be used to determine or profile rejection activities of the host body, as immune cells attempt to destroy transplanted tissue. This may be useful in monitoring the status of transplanted tissue as well as altering the course of treatment or prevention of rejection.

Further, in some embodiments, the methods of the disclosure can be used to characterize the heterogeneity of an abnormal condition in a subject, the method comprising generating a genetic profile of extracellular polynucleotides in the subject, wherein the genetic profile comprises a plurality of data resulting from copy number variation and mutation analyses. In some cases, including but not limited to cancer, a disease may be heterogeneous. Disease cells may not be identical. In the example of cancer, some tumors are known to comprise different types of tumor cells, some cells in different stages of the cancer. In some embodiments, heterogeneity comprises multiple foci of disease. Again, in the example of cancer, there may be multiple tumor foci, perhaps where one or more foci are the result of metastases that have spread from a primary site.

The methods of this disclosure can be used to generate a profile, fingerprint, or set of data that is a summation of genetic information derived from different cells in a heterogeneous disease. This set of data can comprise copy number variation and mutation analyses alone or in combination.

Additionally, the systems and methods of the disclosure can be used to diagnose, prognose, monitor or observe cancers or other diseases of fetal origin. That is, these methodologies may be employed in a pregnant subject to diagnose, prognose, monitor or observe cancers or other diseases in a unborn subject whose DNA and other polynucleotides may co-circulate with maternal molecules. In some embodiments, the systems and methods are useful to diagnose, prognose, monitor or observe a prenatal or pregnancy-related disease or condition. As used herein, the term "prenatal or pregnancy-related disease or condition" refers to any disease, disorder, or condition affecting a pregnant woman, embryo, or fetus. Prenatal or pregancy-related conditions can also refer to any disease, disorder, or condition that is associated with or arises, either directly or indirectly, as a result of pregnancy. These diseases or conditions can include any and all birth defects, congenital conditions, or hereditary diseases or conditions. Examples of prenatal or pregnancy-related diseases include, but are not limited to, Rhesus disease, hemolytic disease of the newborn, beta-thalassemia, sex determination, determination of pregnancy, a hereditary Mendelian genetic disorder, chromosomal aberrations, a fetal chromosomal aneuploidy, fetal chromosomal trisomy, fetal chromosomal monosomy, trisomy 8, trisomy 13 (Patau Syndrom), trisomy 16, trisomy 18 (Edwards syndrome), trisomy 21 (Down syndrome), X-chromosome linked disorders, trisomy X (XXX syndrome), monosomy X (Turner syndrome), XXY syndrome, XYY syndrome, XYY syndrome, XXXY syndrome, XXYY syndrome, XYYY syndrome, XXXXX syndrome, XXXXY syndrome, XXXYY syndrome, XXYYY syndrome, Fragile X Syndrome, fetal growth restriction, cystic fibrosis, a hemoglobinopathy, fetal death, fetal alcohol syndrome, sickle cell anemia, hemophilia, Klinefelter syndrome, dup(17)(p11.2p1.2) syndrome, endometriosis, Pelizaeus-Merzbacher disease, dup(22)(q11.2q11.2) syndrome, cat eye syndrome, cri-du-chat syndrome, Wolf-Hirschhorn syndrome, Williams-Beuren syndrome, Charcot-Marie-Tooth disease, neuropathy with liability to pressure palsies, Smith-Magenis syndrome, neurofibromatosis, Alagille syndrome, Velocardiofacial syndrome, DiGeorge syndrome, steroid sulfatase deficiency, Prader-Willi syndrome, Kallmann syndrome, microphthalmia with linear skin defects, adrenal hypoplasia, glycerol kinase deficiency, Pelizaeus-Merzbacher disease, testis-determining factor on Y, azospermia (factor a), azospermia (factor b), azospermia (factor c), 1p36 deletion, phenylketonuria, Tay-Sachs disease, adrenal hyperplasia, Fanconi anemia, spinal muscular atrophy, Duchenne's muscular dystrophy, Huntington's disease, myotonic dystrophy, Robertsonian translocation, Angelman syndrome, tuberous sclerosis, ataxia telangieltasia, open spina bifida, neural tube defects, ventral wall defects, small-for-gestational-age, congenital cytomegalovirus, achondroplasia, Marfan's syndrome, congenital hypothyroidism, congenital toxoplasmosis, biotinidase deficiency, galactosemia, maple syrup urine disease, homocystinuria, medium-chain acyl Co-A dehydrogenase deficiency, structural birth defects, heart defects, abnormal limbs, club foot, anencephaly, arhinencephaly/holoprosencephaly, hydrocephaly, anophthalmos/microphthalmos, anotia/microtia, transposition of great vessels, tetralogy of Fallot, hypoplastic left heart syndrome, coarctation of aorta, cleft palate without cleft lip, cleft lip with or without cleft palate, oesophageal atresia/stenosis with or without fistula, small intestine atresia/stenosis, anorectal atresia/stenosis, hypospadias, indeterminate sex, renal agenesis, cystic kidney, preaxial polydactyly, limb reduction defects, diaphragmatic hernia, blindness, cataracts, visual problems, hearing loss, deafness, X-linked adrenoleukodystrophy, Rett syndrome, lysosomal disorders, cerebral palsy, autism, aglossia, albinism, ocular albinism, oculocutaneous albinism, gestational diabetes, Arnold-Chiari malformation, CHARGE syndrome, congenital diaphragmatic hernia, brachydactlia, aniridia, cleft foot and hand, heterochromia, Dwarnian ear, Ehlers Danlos syndrome, epidermolysis bullosa, Gorham's disease, Hashimoto's syndrome, hydrops fetalis, hypotonia, Klippel-Feil syndrome, muscular dystrophy, osteogenesis imperfecta, progeria, Smith Lemli Opitz symdrom, chromatelopsia, X-linked lymphoproliferative disease, omphalocele, gastroschisis, pre-eclampsia, eclampsia, pre-term labor, premature birth, miscarriage, delayed intrauterine growth, ectopic pregnancy, hyperemesis gravidarum, morning sickness, or likelihood for successful induction of labor.

Further, in some embodiments, the reports are submitted and accessed electronically via the internet. In certain embodiments, analysis of sequence data occurs at a site other than the location of the subject. The report is generated and transmitted to the subject's location. Via an internet enabled computer, the subject accesses the reports reflecting his tumor burden.

The annotated information can be used by a health care provider to select other drug treatment options and/or provide information about drug treatment options to an insurance company. The method can include annotating the drug treatment options for a condition in, for example, the NCCN Clinical Practice Guidelines in Oncology or the American Society of Clinical Oncology (ASCO) clinical practice guidelines.

The drug treatment options that are stratified in a report can be annotated in the report by listing additional drug treatment options. An additional drug treatment can be an FDA-approved drug for an off-label use. A provision in the 1993 Omnibus Budget Reconciliation Act (OBRA) requires Medicare to cover off-label uses of anticancer drugs that are included in standard medical compendia. The drugs used for annotating lists can be found in CMS approved compendia, including the National Comprehensive Cancer Network (NCCN) Drugs and Biologics Compendiumm", Thomson Micromedex DrugDex®, Elsevier Gold Standard's Clinical Pharmacology compendium, and American Hospital Formulary Service—Drug Information Compendium®.

The drug treatment options can be annotated by listing an experimental drug that may be useful in treating a cancer with one or more molecular markers of a particular status. The experimental drug can be a drug for which in vitro data, in vivo data, animal model data, pre-clinical trial data, or clinical-trial data are available. The data can be published in peer-reviewed medical literature found in journals listed in the CMS Medicare Benefit Policy Manual, including, for example, American Journal of Medicine, Annals of Internal Medicine, Annals of Oncology, Annals of Surgical Oncology, Biology of Blood and Marrow Transplantation, Blood, Bone Marrow Transplantation, British Journal of Cancer, British Journal of Hematology, British Medical Journal, Cancer, Clinical Cancer Research, Drugs, European Journal of Cancer (formerly the European Journal of Cancer and Clinical Oncology), Gynecologic Oncology, International Journal of Radiation, Oncology, Biology, and Physics, The Journal of the American Medical Association, Journal of Clinical Oncology, Journal of the National Cancer Institute, Journal of the National Comprehensive Cancer Network (NCCN), Journal of Urology, Lancet, Lancet Oncology, Leukemia, The New England Journal of Medicine, and Radiation Oncology.

The drug treatment options can be annotated by providing a link on an electronic based report connecting a listed drug to scientific information regarding the drug. For example, a link can be provided to information regarding a clinical trial for a drug (clinicaltrials.gov). If the report is provided via a computer or computer website, the link can be a footnote, a hyperlink to a website, a pop-up box, or a fly-over box with information, etc. The report and the annotated information can be provided on a printed form, and the annotations can be, for example, a footnote to a reference.

The information for annotating one or more drug treatment options in a report can be provided by a commercial entity that stores scientific information. A health care provider can treat a subject, such as a cancer patient, with an experimental drug listed in the annotated information, and the health care provider can access the annotated drug treatment option, retrieve the scientific information (e.g., print a medical journal article) and submit it (e.g., a printed journal article) to an insurance company along with a request for reimbursement for providing the drug treatment. Physicians can use any of a variety of Diagnosis-related group (DRG) codes to enable reimbursement.

A drug treatment option in a report can also be annotated with information regarding other molecular components in a pathway that a drug affects (e.g., information on a drug that targets a kinase downstream of a cell-surface receptor that is a drug target). The drug treatment option can be annotated with information on drugs that target one or more other molecular pathway components. The identification and/or annotation of information related to pathways can be outsourced or subcontracted to another company.

The annotated information can be, for example, a drug name (e.g., an FDA approved drug for off-label use; a drug found in a CMS approved compendium, and/or a drug described in a scientific (medical) journal article), scientific information concerning one or more drug treatment options, one or more links to scientific information regarding one or more drugs, clinical trial information regarding one or more drugs (e.g., information from clinicaltrials.gov/), one or more links to citations for scientific information regarding drugs, etc.

The annotated information can be inserted into any location in a report. Annotated information can be inserted in multiple locations on a report. Annotated information can be inserted in a report near a section on stratified drug treatment options. Annotated information can be inserted into a report on a separate page from stratified drug treatment options. A report that does not contain stratified drug treatment options can be annotated with information.

The system can also include reports on the effects of drugs on sample (e.g. tumor cells) isolated from a subject (e.g. cancer patient). An in vitro culture using a tumor from a cancer patient can be established using various techniques. The system can also include high-throughput screening of FDA approved off-label drugs or experimental drugs using said in vitro culture and/or xenograft model. The system can also include monitoring tumor antigen for recurrence detection.

The system can provide internet enabled access of reports of a subject with cancer. The system can use a handheld DNA sequencer or a desktop DNA sequencer. The DNA sequencer is a scientific instrument used to automate the DNA sequencing process. Given a sample of DNA, a DNA sequencer is used to determine the order of the four bases: adenine, guanine, cytosine, and thymine. The order of the DNA bases is reported as a text string, called a read. Some DNA sequencers can be also considered optical instruments as they analyze light signals originating from fluorochromes attached to nucleotides.

The DNA sequencer can apply Gilbert's sequencing method based on chemical modification of DNA followed by cleavage at specific bases, or it can apply Sanger's technique which is based on dideoxynucleotide chain termination. The Sanger method became popular due to its increased efficiency and low radioactivity. The DNA sequencer can use techniques that do not require DNA amplification (polymerase chain reaction—PCR), which speeds up the sample preparation before sequencing and reduces errors. In addition, sequencing data is collected from the reactions caused by the addition of nucleotides in the complementary strand in real time. For example, the DNA sequencers can utilize a method called single-molecule real-time (SMRT), where sequencing data is produced by light (captured by a camera) emitted when a nucleotide is added to the complementary strand by enzymes containing fluorescent dyes. Alternatively, the DNA sequencers can use electronic systems based on nanopore sensing technologies.

The data is sent by the DNA sequencers over a direct connection or over the internet to a computer for processing. The data processing aspects of the system can be implemented in digital electronic circuitry, or in computer hardware, firmware, software, or in combinations of them. Data processing apparatus of the present disclosure can be implemented in a computer program product tangibly embodied in a machine-readable storage device for execution by a programmable processor; and data processing method steps of the present disclosure can be performed by a programmable processor executing a program of instructions to perform functions of the present disclosure by operating on input data and generating output. The data processing aspects of the present disclosure can be implemented advantageously in one or more computer programs that are executable on a programmable system including at least one programmable processor coupled to receive data and instructions from and to transmit data and instructions to a data storage system, at least one input device, and at least one output device. Each computer program can be implemented in a high-level procedural or object-oriented programming language, or in assembly or machine language, if desired; and, in any case, the language can be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the present disclosure can be implemented using a computer system having a display device such as a monitor or LCD (liquid crystal display) screen for displaying information to the user and input devices by which the user can provide input to the computer system such as a keyboard, a two-dimensional pointing device such as a mouse or a trackball, or a three-dimensional pointing device such as a data glove or a gyroscopic mouse. The computer system can be programmed to provide a graphical user interface through which computer programs interact with users. The computer system can be programmed to provide a virtual reality, three-dimensional display interface.

All publications and patent applications mentioned in this specification are herein incorporated by reference to the same extent as if each individual publication or patent application were specifically and individually indicated to be incorporated by reference.

From the foregoing it will be appreciated that, although specific embodiments of the present disclosure have been described herein for purposes of illustration, various modifications may be made without deviating from the spirit and scope of the present disclosure. Accordingly, the present disclosure is not limited except as by the appended claims.

While preferred embodiments of the present disclosure have been shown and described herein, it will be obvious to those skilled in the art that such embodiments are provided by way of example only. It is not intended that the present disclosure be limited by the specific examples provided within the specification. While the present disclosure has been described with reference to the aforementioned specification, the descriptions and illustrations of the embodiments herein are not meant to be construed in a limiting sense. Numerous variations, changes, and substitutions will now occur to those skilled in the art without departing from the present disclosure. Furthermore, it shall be understood that all aspects of the present disclosure are not limited to the specific depictions, configurations or relative proportions set forth herein which depend upon a variety of conditions and variables. It should be understood that various alternatives to the embodiments of the present disclosure described herein may be employed in practicing the present disclosure. It is therefore contemplated that the present disclosure shall also cover any such alternatives, modifications, variations or equivalents. It is intended that the following claims define the scope of the present disclosure and that methods and structures within the scope of these claims and their equivalents be covered thereby.

What is claimed is:

1. A method of calling a genetic variant, comprising:

obtaining a sample from an individual subject having cancer that comprises cell-free DNA (cfDNA) molecules;

adding an amount of genomic DNA (gDNA) molecules from the individual subject to the sample such that the amount of gDNA in the sample is from about 1% to about 5% of total DNA in the sample, wherein the gDNA molecules are 400 bases or longer;

differentially tagging a plurality of the gDNA molecules and a plurality of the cfDNA molecules by ligating the gDNA molecules with a first plurality of barcodes and ligating the cfDNA molecules with a second plurality of barcodes, wherein the barcodes from the first plurality of barcodes are distinguishable from the barcodes from the second plurality of barcodes, thereby producing tagged gDNA molecules and tagged cfDNA molecules;

sequencing a plurality of the tagged gDNA molecules to produce a plurality of gDNA sequence reads, and sequencing a plurality of the tagged cfDNA molecules to produce a plurality of cfDNA sequence reads;

detecting that the genetic variant is present in the sample based on (i) at least a portion of the plurality of gDNA sequence reads having one or more first differences at a genetic locus in relation to a reference genome that correspond to the genetic variant and (ii) at least a portion of the plurality of cfDNA sequence reads having one or more second differences at the genetic locus in relation to the reference genome that correspond to the genetic variant;

identifying, by one or more computers, individual gDNA sequence reads of the plurality of gDNA sequence reads based on a respective barcode of the first plurality of barcodes;

identifying, by the one or more computers, individual cfDNA sequence reads of the plurality of cfDNA sequence reads based on a respective barcode of the second plurality of barcodes;

determining, by the one or more computers, a first allelic frequency of the genetic variant at the genetic locus from the plurality of cfDNA sequence reads, wherein the first allelic frequency is determined relative to the reference genome;

determining, by the one or more computers and based on the first allelic frequency, a first genotype at the genetic locus;

determining, by the one or more computers, a second allelic frequency of the genetic variant at the genetic locus from the plurality of gDNA sequence reads, wherein the second allelic frequency is determined relative to the reference genome;

determining, by the one or more computers and based on the second allelic frequency, a second genotype at the genetic locus that corresponds to a germline genotype; and analyzing, by the one or more computers, the first genotype with respect to the second genotype to call the genetic variant as a germline variant or a somatic variant in the individual subject.

2. A method of calling a genetic variant, comprising:
obtaining a sample from an individual subject having cancer that comprises cell-free DNA (cfDNA) molecules;
adding an amount of genomic DNA (gDNA) molecules from the individual subject to the sample such that the amount of gDNA in the sample is from about 1% to about 5% of total DNA in the sample, wherein the gDNA molecules are 400 bases or longer;
differentially tagging a plurality of the gDNA molecules and a plurality of the cfDNA molecules by ligating the gDNA molecules with a first plurality of barcodes and ligating the cfDNA molecules with a second plurality of barcodes, wherein the barcodes from the first plurality of barcodes are distinguishable from the barcodes from the second plurality of barcodes, thereby producing tagged gDNA molecules and tagged cfDNA molecules;
sequencing a plurality of the tagged gDNA molecules to produce a plurality of gDNA sequence reads, and sequencing a plurality of the tagged cfDNA molecules to produce a plurality of cfDNA sequence reads;
detecting that the genetic variant is present in the sample based on (i) at least a portion of the plurality of gDNA sequence reads having one or more first differences at a genetic locus in relation to a reference genome that correspond to the genetic variant and (ii) at least a portion of the plurality of cfDNA sequence reads having one or more second differences at the genetic locus in relation to the reference genome that correspond to the genetic variant;
determining, by one or more computers, a first allelic frequency of the genetic variant at a genetic locus in the plurality of cfDNA sequence reads or in a plurality of cfDNA consensus sequences, wherein cfDNA sequence reads of the plurality of cfDNA sequence reads are identified using a barcode of the second plurality of barcodes, wherein the first allelic frequency of the genetic variant is determined relative to a reference genome;
determining, by the one or more computers and based on the first allelic frequency, a first genotype at the genetic locus, the first genotype being consistent with homozygosity at the genetic locus, heterozygosity at the genetic locus, or indicating that the variant is a somatic mutation,
determining, by the one or more computers, a second allelic frequency of the genetic variant at the genetic locus in the plurality of gDNA sequence reads or in a plurality of gDNA consensus sequences, wherein the second allelic frequency is determined relative to the reference genome, wherein gDNA sequence reads of the plurality of gDNA sequence reads are identified using a barcode of the first plurality of barcodes,
determining, by the one or more computers and based on the second allelic frequency, a second genotype at the genetic locus, the second genotype indicating a germline genotype that is consistent with homozygosity at the genetic locus or heterozygosity at the genetic locus; and
calling the genetic variant as a germline variant or as a somatic mutation based on the first genotype and the second genotype.

3. The method of claim 2, wherein the first genotype is also determined based on one or more predetermined criteria, the one or more predetermined criteria corresponding to the first allelic frequency of the genetic variant at the genetic locus in the plurality of cfDNA sequence reads or in the plurality of cfDNA consensus sequences being between about 30% and about 70%.

4. The method of claim 1, further comprising determining the second genotype using a probabilistic function of the second allelic frequency of the genetic variant at the genetic locus in the plurality of gDNA sequence reads.

5. The method of claim 1, wherein determining the second genotype comprises identifying a homozygous genotype for an allele at the genetic locus if the allele has a frequency of at least about 95% in the plurality of gDNA sequence reads.

6. The method of claim 1, wherein determining the second genotype comprises identifying a heterozygous genotype for an allele at the genetic locus if the allele has a frequency of between about 30% and about 70% in the plurality of gDNA sequence reads.

7. The method of claim 1, further comprising determining that the first allelic frequency of the genetic variant at the genetic locus in the cfDNA corresponds to a heterozygous genotype or a homozygous genotype.

8. The method of claim 2, further comprising determining the second genotype using a probabilistic function of the second allelic frequency of the genetic variant at the genetic locus in the plurality of gDNA sequence reads or in the plurality of gDNA consensus sequences.

9. The method of claim 2, wherein determining the second genotype comprises identifying a homozygous genotype for an allele at the genetic locus when the allele has a frequency of at least about 95% in the plurality of gDNA sequence reads or in the plurality of gDNA consensus sequences.

10. The method of claim 2, wherein determining the second genotype comprises identifying a heterozygous genotype for an allele at the genetic locus when the allele has a frequency of between about 30% and about 70% in the plurality of gDNA sequence reads or in the plurality of gDNA consensus sequences.

11. The method of claim 2, wherein the reference genome is not derived from the subject.

12. The method of claim 1, wherein the gDNA comprises no more than about 3% of the total DNA in the sample.

13. The method of claim 1 or 2, further comprising ligating the gDNA molecules and the cfDNA molecules by blunt-end ligation.

14. The method of claim 1 or 2, further comprising ligating the gDNA molecules and the cfDNA molecules by sticky-end ligation.

15. The method of claim 1, comprising:
determining, by the one or more computers, a plurality of sequence reads that correspond to the genetic variant, the plurality of sequence reads being generated from the tagged gDNA molecules and the tagged cfDNA molecules;
determining, by the one or more computers, first sequence reads of the plurality of sequence reads having first lengths within a first range of values;
determining, by the one or more computers, that the first sequence reads correspond to at least a portion of the gDNA sequence reads;
determining, by the one or more computers, second sequence reads of the plurality of sequence reads having second lengths within a second range of values that is lower than the first range of values; and determining, by the one or more computers, that the second sequence reads correspond to at least a portion of the cfDNA sequence reads.

16. The method of claim 1, wherein the gDNA molecules are 500 bp or longer.

17. The method of claim 2, wherein the gDNA molecules are 500 bp or longer.

* * * * *